(12) United States Patent
Washiro

(10) Patent No.: US 7,890,053 B2
(45) Date of Patent: Feb. 15, 2011

(54) COMMUNICATION SYSTEM

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 760 days.

(21) Appl. No.: 11/838,509

(22) Filed: Aug. 14, 2007

(65) Prior Publication Data
US 2008/0064331 A1 Mar. 13, 2008

(30) Foreign Application Priority Data
Sep. 11, 2006 (JP) ............................. 2006-245616
Jun. 4, 2007 (JP) ............................. 2007-148672

(51) Int. Cl.
*H04B 5/00* (2006.01)
(52) U.S. Cl. ...................... 455/41.1; 343/745; 343/750; 343/790; 343/791; 343/850; 343/853; 343/857; 343/858; 343/860
(58) Field of Classification Search ................ 455/41.1; 343/745, 747, 750, 790–792, 850, 853, 857, 343/858, 860
See application file for complete search history.

(56) References Cited

U.S. PATENT DOCUMENTS

| | | | |
|---|---|---|---|
| 2,685,068 A | | 3/1950 | Goubau |
| 2,921,277 A | | 7/1956 | Goubau |
| 4,301,456 A | * | 11/1981 | Lovick, Jr. .................. 343/708 |
| 5,555,337 A | | 9/1996 | Hata |
| 5,557,290 A | * | 9/1996 | Watanabe ................... 343/713 |
| 6,677,763 B2 | * | 1/2004 | Geisel ........................ 324/640 |
| 7,151,497 B2 | * | 12/2006 | Crystal ....................... 343/747 |

FOREIGN PATENT DOCUMENTS

| | | |
|---|---|---|
| JP | 07-175987 | 7/1995 |
| JP | 09-018393 | 1/1997 |
| JP | 2003-115707 | 4/2003 |
| JP | 2004-214879 | 7/2004 |
| JP | 2004-297107 | 10/2004 |
| JP | 2005-18671 | 1/2005 |
| JP | 2006-60283 | 3/2006 |
| JP | 2006-106612 | 4/2006 |

OTHER PUBLICATIONS

Teshirogi Tasuku et al., "Modern Millimeter-Wave Technologies", Ohmsha p. 119.
Toshimi Meiri, "Study of Surface-Waves Propagated through Two Ferrite Rods in Parallel", Shizuoka University.
Yasuto Mushiake, "Antenna Denpa Denpan (Antenna/Radio-Wave Propagation)" Corona Publishing Co., Ltd., 1985, pp. 16-18.
Masamitsu Nakajima, "Microwave Engineering", Morikita Publishing Company, pp. 182-190.

* cited by examiner

*Primary Examiner*—Tuan A Tran
(74) *Attorney, Agent, or Firm*—Finnegan, Henderson, Farabow, Garrett & Dunner, L.L.P.

(57) ABSTRACT

A communication system includes a transmitter including a transmission circuit unit that generates an RF signal for transmitting data and an electric-field-coupling antenna that transmits the RF signal as an electrostatic field, a receiver including an electric-field-coupling antenna and a reception circuit unit that subjects an RF signal received by the electric-field-coupling antenna to reception processing, and a surface-wave propagating means for providing a surface wave transmission line made of a conductor that propagates a surface wave radiated from the electric-field-coupling antenna of the transmitter along a surface of the surface wave transmission line.

18 Claims, 24 Drawing Sheets

NO REFLECTION WAVE IS GENERATED IF IMPEDANCES ARE MATCHED

ELECTRIC FIELD DISTRIBUTION

MAGNETIC FIELD DISTRIBUTION

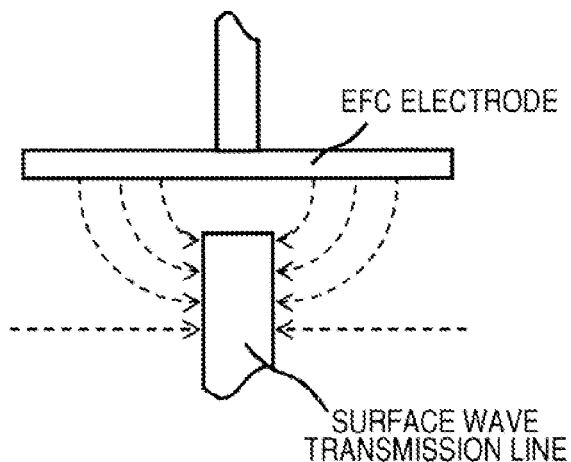
FIG. 35A
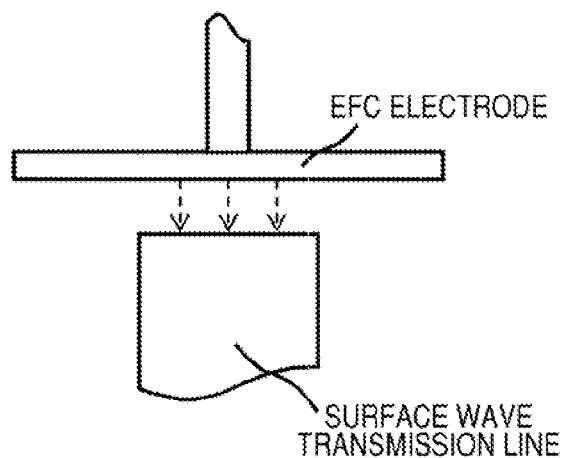
FIG. 35B
FIG. 36
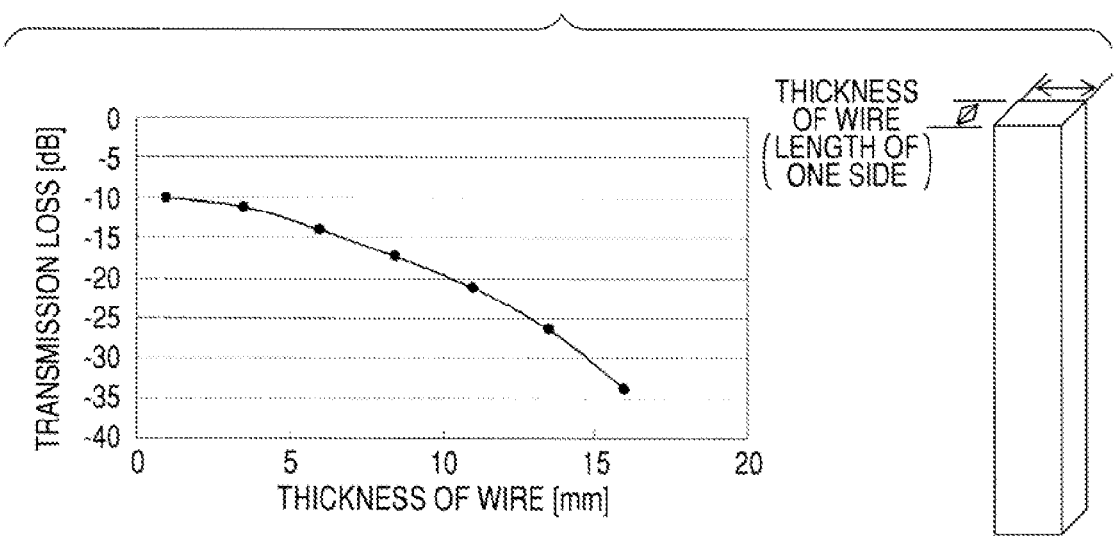

COMMUNICATION SYSTEM

CROSS-REFERENCES TO RELATED APPLICATIONS

The present invention contains subject matter related to Japanese Patent Applications JP 2006-245616 and JP 2007-148672 filed in the Japanese Patent Office on Sep. 11, 2006 and Jun. 4, 2007, respectively, the entire contents of which being incorporated herein by reference.

BACKGROUND OF THE INVENTION

1. Field of the Invention

The present invention relates to a communication system that performs bulk data communication between information apparatuses, and, more particularly to a communication system that performs data communication without interference with other communication systems between information apparatuses using an electrostatic field (a quasi-electrostatic field) or an induction field.

More specifically, the present invention relates to a communication system that realizes bulk transmission by electric-field-coupling using radio-frequency (hereinafter referred to as RF) signals, and, more particularly to a communication system that extends a distance between electrodes of a transmitter and a receiver to be field-coupled and makes an arrangement between the transmitter and the receiver and designs of communication apparatuses flexible.

2. Description of the Related Art

Recently, when data is transferred between small-sized information apparatuses, for example, when data of images, music, and the like are exchanged between personal computers, a radio interface is often used instead of a method of transferring data via data communication performed by mutually connecting the apparatuses with a general-purpose cable such as an AV (Audio Visual) cable or a USB (Universal Serial Bus) cable or via a medium such as a memory card. When the radio interface is used, it is unnecessary to reattach a connector and draw around a cable every time data transfer is performed and convenience for a user is high. Many information apparatuses implemented with various cableless communication functions are also placed on the market.

As a method of performing data transfer between small-sized apparatuses without using a cable, radio wave communication schemes for transmitting and receiving radio signals using antennas such as wireless LAN (Local Area Network) communication and Bluetooth (registered trademark) communication represented by IEEE802.11 are developed. For example, a portable image recording apparatus is proposed in which an antenna is built in a position not covered by a hand that grips a grip section and, since the built-in antenna is not covered by the hand and correct image data is received, even if an antenna for radio communication is arranged in the apparatus, a characteristic inherent in the antenna is directly displayed (see, for example, JP-A-2006-106612).

Most of the radio communication systems of the past adopt the radio wave communication scheme and propagates a signal using a radiation-electric-field generated when an electric current is fed to an aerial (an antenna). In this case, since a transmitter emits a radio wave regardless of whether there is a communication partner, the transmitter is likely to be a generation source of a radio wave interfering with a communication system near the transmitter. Since an antenna of a receiver receives not only a desired wave from the transmitter but also radio waves arriving from a distance, the receiver is susceptible to an interference radio wave around the receiver. The interference ratio wave causes the deterioration in reception sensitivity. When there are plural communication partners, it is necessary to perform complicated setting in order to select a desired communication partner out of the plural communication partners. For example, when plural pairs of radios perform radio communication in a narrow range, each of the pairs needs perform division multiplexing such as frequency selection to communicate with each other in order to prevent interference among the pairs. Further, since the transmitter and the receiver may be unable to communicate with each other when directions of polarization of radio waves are orthogonal, polarization directions of antennas need to be the same between the transmitter and the receiver.

For example, considering a non-contact data communication system in a very short distance such as several millimeters to several centimeters, it is preferable that the transmitter and the receiver are firmly coupled in a short distance and, on the other hand, for prevention of interference with other systems, signals do not reach a long distance. It is desirable that apparatuses that perform data communication are coupled without depending on postures (directions) when the apparatuses are places in a short distance, i.e., the apparatuses have not directivity. When bulk data communication is performed, it is desirable that wideband communication is possible.

As the radio communication, other than the radio wave communication performed in which the radiation-electric-field is used, there are communication schemes in which an electrostatic field, an induction field, and the like are used. For example, in the existing non-contact communication system mainly used for RFID (Radio Frequency Identification), an electric-field-coupling scheme and an electromagnetic induction scheme are applied. The electrostatic field and the induction field are inversely proportional to the cube and the square of distances from generation sources thereof, respectively. Therefore, in the non-contact communication system of this type, since a transmission signal steeply attenuates according to a distance, a coupling relation is not formed when no communication partner is present nearby. Thus, the communication system does not interfere with other communication systems. Even if a radio wave arrives from a distance, since an electric-field-coupling antenna (coupler) (hereinafter referred to as EFC antenna) does not receive the radio wave, the communication system is prevented from being interfered by other communication systems.

For example, an RFID tag system is proposed in which, a set of plural communication supporting bodies arranged to place RFID tags among the communication supporting bodies are formed and the RFID tags attached to plural commodities are arranged to be placed among the communication supporting bodies, whereby, even in a state in which the RFID tags overlap each other, it is possible to stably read and write information (see, for example, JP-A-2006-60283).

A data communication apparatus is proposed which includes an apparatus main body and wearing means for wearing this apparatus main body, includes an antenna coil and data communication means for performing data communication in a non-contact manner with an external communication apparatus via this antenna coil, has the antenna coil and the data communication means arranged in an outer caser provided in an upper part of the apparatus main body, and uses an induction magnetic field (see, for example, JP-2004-214879).

A cellular phone is proposed in which an antenna coil for performing data communication with an external apparatus is mounted on a memory card inserted in a portable information apparatus and an antenna coil for RFID is arranged on the outer side of a memory card slot of the portable information apparatus to secure a communication distance without spoiling portability in the RFID (see, for example, JP-A-2005-18671).

The RFID system of the past that uses an electrostatic field or an induction field has a low communication speed because a low-frequency signal is used and, therefore, is unsuitable for bulk data transmission. To cope with this problem, the inventors consider that it is possible to perform bulk transmission by transmitting an RF signal according to electric-field-coupling.

However, whereas the field intensity of a radiation-electric-field gently attenuates in inverse proportion to a distance, the field intensity of the electrostatic field and the field intensity of the induction field steeply attenuate in inverse proportion to the square and the cube of the distance, respectively, i.e., attenuation of a signal due to a communication distance is large. Since a propagation loss occurs according to the length of a propagation distance with respect to a wavelength, when an RF signal is propagated by electric-field-coupling, a problem of a propagation loss corresponding to an inter-electrode distance is conspicuous. Therefore, it is necessary to bring coupling electrodes of a transmitter and a receiver into close contact with each other as much as possible. To bring the coupling electrodes sufficiently close to each other, it is necessary to perform fine positioning between the electrodes and positions of the electrodes have to be held during data communication. Thus, convenience of use for a user is low. Further, it is difficult for the transmitter and the receiver to directly communicate with each other in a long distance.

Moreover, when a coupling electrode is mounted in a housing of a communication apparatus, it is necessary to arrange the electrode on the outer side of the housing as much as possible to reduce the inter-electrode distance during data communication. Thus, a degree of freedom of layout in designing the housing is limited. It goes without saying that it is desirable that the coupling electrode is small and low cost.

SUMMARY OF THE INVENTION

Therefore, it is desirable to provide an excellent communication system that can perform data communication without interference with other communication systems using an electrostatic field or an induction field between information apparatuses.

It is also desirable to provide an excellent communication system that can realize bulk data transmission according to a communication scheme in which an electrostatic field or an induction field using RF signals is employed.

It is also desirable to provide an excellent communication system that can extend a distance between coupling electrodes of a transmitter and a receiver to make an arrangement between the transmitter and the receiver and designs of communication apparatuses flexible.

According to an embodiment of the present invention, there is provided a communication system including a transmitter including a transmission circuit unit that generates an RF signal for transmitting data and an EFC antenna that transmits the RF signal as an electrostatic field, a receiver including an EFC antenna and a reception circuit unit that subjects an RF signal received by the EFC antenna to reception processing, and surface-wave propagating means for providing a surface wave transmission line made of a conductor that propagates a surface wave radiated from the EFC antenna of the transmitter along a surface of the surface wave transmission line.

The "system" in this context means a logical collection of plural apparatuses (or functional modules that realize specific functions) and it does not matter whether the respective apparatuses or the respective functional modules are housed in a single housing (the same applies in the following explanation).

When it is possible to perform data transfer between small-sized information apparatuses in a cableless manner, for example, it is possible to exchange data of images, music, and the like between personal computers, convenience for a user is improved. However, in many radio communication systems represented by the wireless LAN, since a radiation-electric-field generated when an electric current is fed to an antenna is used, a transmitter emits a radio wave regardless of whether there is a communication partner. Since the radiation-electric-field gently attenuates in inverse proportion to a distance from the antenna, a signal reaches a relatively long distance. Therefore, the transmitter is likely to be a generation source of a radio wave interfering with a communication system near the transmitter. Reception sensitivity of an antenna of a receiver is deteriorated because of an influence of the interference radio wave. In short, in the radio wave communication scheme, it is difficult to realize radio communication limited to a communication partner in a very short distance.

On the other hand, in the communication system that uses an electrostatic field or an induction field, a coupling relation is not formed when no communication partner is present nearby. The field intensity of the induction field and the field intensity of the electrostatic field steeply attenuate in inverse proportion to the square and the cube of a distance, respectively. In other words, since an unnecessary electric field is not generated and an electric field does not reach a long distance, the communication system does not interfere with other communication systems. Even if a radio wave arrives from a distance, since an EFC electrode does not receive the radio wave, the communication system is prevented from being interfered by other communication systems.

In the non-contact communication system of the past that uses an electrostatic field or an induction field, a low-frequency signal is used. Thus, the non-contact communication system is unsuitable for bulk data transmission. However, the inventors consider that it is possible to perform the bulk data transmission even in the non-contact communication system of this type by using an RF signal.

However, the field intensity of the induction field and the field intensity of the electrostatic field steeply attenuate in inverse proportion to the square and the cube of a distance, respectively. When the RF signal is used, since the RF signal has a short wavelength, a propagation loss is large. Therefore, communication over a long distance cannot be performed because it is necessary to bring EFC electrodes of a transmitter and a receiver into close contact with each other as much as possible. To bring the EFC electrodes sufficiently close to each other, it is necessary to perform fine positioning between the electrodes and positions of the electrodes have to be held during data communication. Thus, convenience of use for the user is low.

Therefore, the communication system according to the embodiment of the present invention adopts a communication scheme for transmitting an RF signal according to electric-field-coupling. Since the surface-wave propagating means transmits a surface wave radiated from the EFC electrode of the transmitter, it is possible to perform data transfer without bringing the electrodes of the transmitter and the receiver sufficiently close to each other and performing fine positioning.

The surface-wave propagating means includes a surface wave transmission line made of a linear member formed by using a copper wire or other conductors. The surface-wave propagating means is disposed along a traveling direction of a longitudinal wave, i.e., a surface wave, among electromagnetic waves radiated from the EFC electrode of the transmitter. Compared with propagation of the surface wave on a free space in which the surface wave transmission line is not arranged, since the surface wave transmission line is interposed between the EFC antennas of the transmitter and the receiver, it is possible to reduce a propagation loss.

Therefore, in the communication system according to the embodiment of the present invention, it is possible to transmit a surface wave radiated by electric-field-coupling with a low propagation loss and perform data communication even if the EFC electrodes of the transmitter and the receiver are spaced apart from each other at a relative long distance. When non-contact transmission is performed, the user does not need to bring the EFC electrodes of the transmitter and the receiver into direct close contact with each other.

Moreover, in order to efficiently acquire a surface wave, which is generated by the transmitter, on the surface wave transmission line and efficiently transmit a transmitted surface wave to the receiver, EFC electrodes for electric-field-coupling with the EFC antenna of the transmitter or the receiver may be attached to respective ends of the surface wave transmission line to be substantially perpendicular to a traveling direction of the surface wave.

The surface of the surface wave transmission line may be coated with an insulator to prevent short circuit from being caused by contact of the user's hand or a conductive foreign matter. Alternatively, the surface wave transmission line may be embedded in an insulative object.

In the surface wave transmission line made of a conductor such as a copper wire, compared with a surface wave transmission line made of a dielectric or a magnetic substance, a propagation loss of a surface wave is remarkably reduced.

Therefore, it is possible to use the surface wave transmission line made of a conductor as an extension cable for extending a communication distance of non-contact communication with a simple structure. It is also possible to form a section of the transmission line sufficiently small compared with that of the EFC electrode.

The surface wave transmission line made of a conductor has an extremely low propagation loss and is sufficiently usable even if the transmission line is branched or bound. Thus, it is possible to disperse communication spots for performing non-contact communication in plural places, relax positioning accuracy for electrodes of the non-contact communication system that performs communication according to electric-field-coupling, and perform communication in plural locations.

When plural communication spots in which a transmitter and a receiver are set are provided in a space to which the communication system according to the present invention is applied, the surface-wave propagating means may include a surface wave transmission line for transmitting surface waves of an RF signal from the transmitter to the plural communication spots in which the receiver is set.

For example, plural surface wave transmission lines that connect the communication spot in which the transmitter is set and the respective communication spots in which the receiver can be set, respectively, only have to be laid.

Alternatively, the surface-wave propagating means may include surface wave transmission lines for each combination of the communication spots and, in each of the communication spots, the plural surface wave transmission lines laid for communicating with the other communication spots may be bound. The surface wave transmission line from one communication spot on a transmission side may be branched to the plural communication spots in which the receiver is set.

Here, in the transmitter, an RF signal transmission line, through which an RF signal generated by the transmission circuit unit is transmitted, is connected to substantially the center of the electrode of the EFC antenna via a resonating section that resonates at a predetermined frequency. In the receiver, an RF signal transmission line, which transmits an RF signal to the reception circuit unit, is connected to substantially the center of the electrode of the EFC antenna via a resonating section that resonates at a predetermined frequency.

The resonating section can be made of a lumped constant circuit. Specifically, the resonating section includes a parallel inductor connected between a signal line and a ground of the RF transmission line and a series inductor connected between a signal line and the electrode of the RF transmission line. Alternatively, the resonating section can be constituted by a distributed constant circuit. Specifically, a conductor pattern (also referred to as "stub") having length dependent on a wavelength in use is formed on a printed board mounted with the EFC antenna. This conductor pattern acts as the resonating section.

According to the embodiment of the present invention, it is possible to provide an excellent communication system that can perform data communication without interference with other communication systems using an electrostatic field or an induction field between information apparatuses.

According to the embodiment of the present invention, it is possible to provide an excellent communication system that can realize bulk data transmission of an RF signal according to a communication scheme in which an electrostatic field or an induction field is used.

According to the embodiment of the present invention, it is possible to provide an excellent communication system that can extend a distance between EFC electrodes of a transmitter and a receiver to make an arrangement between the transmitter and the receiver and designs of communication apparatuses flexible.

In the communication system according to the embodiment of the present invention, the surface-wave propagating means efficiently transmits a surface wave radiated from the EFC electrode of the transmitter with a low propagation loss. Thus, when data communication is performed, the user does not need to bring the EFC electrodes of the transmitter and the receiver into direct close contact with each other. It is possible to perform data communication by electric-field-coupling even in a long distance.

In the communication system according to the embodiment of the present invention, it is unnecessary to perform fine positioning between the electrodes in order to bring the electrodes to be field-coupled sufficiently close to each other. Moreover, it is unnecessary to arrange the housing in the communication apparatus on the outer side in the housing. Thus, a degree of freedom of layout design of the housing is increased.

In the communication system according to the present invention, it is possible to electrically separate the EFC electrodes of the transmitter and the receiver from the surface wave transmission line provided by the surface-wave propagating means and use the EFC electrodes and the surface wave transmission line in a non-contact state. It is also possible to electrically separate the surface wave transmission line in the middle and use the separated surface wave transmission lines in a non-contact state. Thus, it is possible to apply the communication system to non-contact communication in which there is no physical contact between apparatuses and between the apparatuses and members.

In the surface wave transmission line made of a conductor such as a copper wire, compared with the surface wave transmission line made of a dielectric or the like, a propagation loss of a surface wave is remarkably reduced. Thus, it is possible to use the surface wave transmission line made of a conductor as an extension cable for extending a communication distance of non-contact communication with a simple structure.

The surface wave transmission line made of a conductor such as a copper wire has an extremely low propagation loss in transmission of a surface wave from the transmitter to the receiver even if the transmission line is branched or bound. Thus, it is possible to disperse communication spots for performing non-contact communication in plural places, relax positioning accuracy for electrodes of the non-contact communication system that performs communication according to electric-field-coupling, and perform communication in plural locations.

Other objects, characteristics, and advantages of the present invention will be made apparent by more detailed explanation based on embodiments of the present invention described later and the accompanying drawings.

BRIEF DESCRIPTION OF THE DRAWINGS

FIG. 12 is a diagram showing a state in which the surface wave transmission line 30 shown in FIG. 11 is embedded in an insulator that constitutes a rack or the like;

FIG. 35A is a diagram for explaining a mechanism of an electric field $E_R$ of a longitudinal wave, which is generated on the surface of an EFC electrode of an EFC antenna, transferring at the end of a surface wave transmission line as a surface wave;

FIG. 35B is a diagram for explaining the mechanism of an electric field $E_R$ of a longitudinal wave, which is generated on the surface of an EFC electrode of an EFC antenna, transferring at the end of a surface wave transmission line as a surface wave;

FIG. 36 is a graph showing a result obtained by simulating a relation between the thickness of the surface wave transmission line made of a metal wire and a propagation loss using a finite element method;

DESCRIPTION OF THE PREFERRED EMBODIMENTS

Figure 1:
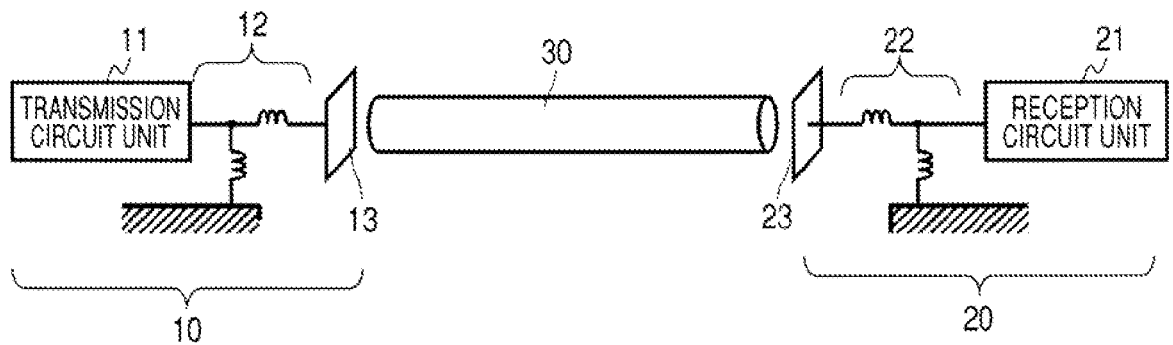
FIG. 1 is a diagram showing an example of a structure of a communication system according to an embodiment of the present invention.

Embodiments of the present invention will be hereinafter explained in detail with reference to the accompanying drawings.

The present invention relates to a communication system that performs data transmission between information apparatuses using an electrostatic field or an induction field.

According to a communication scheme based on an electrostatic field or an induction field, there is no coupling relation and a radio wave is not radiated when a communication partner is not present nearby. Thus, the communication system does not interfere with other communication systems. Even if a radio wave arrives from a distance, since an EFC antenna does not receive the radio wave, the communication system is not interfered by the other communication systems.

The field intensity of a radiation-electric-field is inversely proportional to a distance in the radio wave communication in the past in which an antenna is used. On the other hand, since the field intensity attenuates in inverse proportion to the square of a distance in the induction field and the field intensity attenuates in inverse proportion to the cube of a distance in the electrostatic field, according to the communication scheme based on electric-field-coupling, it is possible to form extremely low power radio of about a noise level for other radio systems present nearby. Thus, it is unnecessary to obtain a license for a radio station.

An electrostatic field that fluctuates in terms of time may be referred to as "quasi-electrostatic field". In this specification, the electrostatic field and the quasi-electrostatic field are collectively referred to as "electrostatic field".

In the communication system of the past in which an electrostatic field or an induction field is used, a low-frequency signal is used. Thus, the communication system is unsuitable for bulk data transmission. On the other hand, in the communication system according to the embodiment of the present invention, it is possible to perform bulk transmission by transmitting an RF signal according to electric-field-coupling, it is possible to perform bulk transmission. Specifically, it is possible to realize extremely low power radio and bulk data communication by applying a communication system in which an RF and a wideband are used such as UWB (Ultra Wide Band) communication to electric-field-coupling.

In the UWB communication, it is possible to use an extremely wide frequency band of 3.1 GHz to 10.6 GHz and realize bulk radio data transmission at about 100 Mbps, although in a short distance. The UWB communication is a communication technique originally developed as a radio wave communication scheme in which an antenna is used. For example, in IEEE802.15.3, a data transmission scheme for a packet structure including a preamble is devised as an access control scheme for the UWB communication. Intel Corporation in the United States is examining a radio version of the USB, which is widespread as a general-purpose interface for personal computers, as an application of the UWB.

In the UWB communication, data transmission at speed exceeding 100 Mbps is possible without occupying a transmission band of 3.1 GHz to 10.6 GHz and it is easy to form an RF circuit. Taking these points into account, a transmission system that uses a UWB low band of 3.1 GHz to 4.9 GHz is positively developed. The inventors consider that a data transmission system that uses the UWB low band is one of effective radio communication techniques implemented in mobile apparatuses. For example, it is possible to realize high-speed data transmission in a short distance area such as an ultra-high speed DAN (Device Area Network) for a short distance including a storage device.

The inventors consider that, according to a UWB communication system that uses an electrostatic field or an induction field, data communication by a feeble electric field is possible and it is possible to transfer bulk data such as moving images and music data for one CD at high speed and in a short time.

Figure 24:
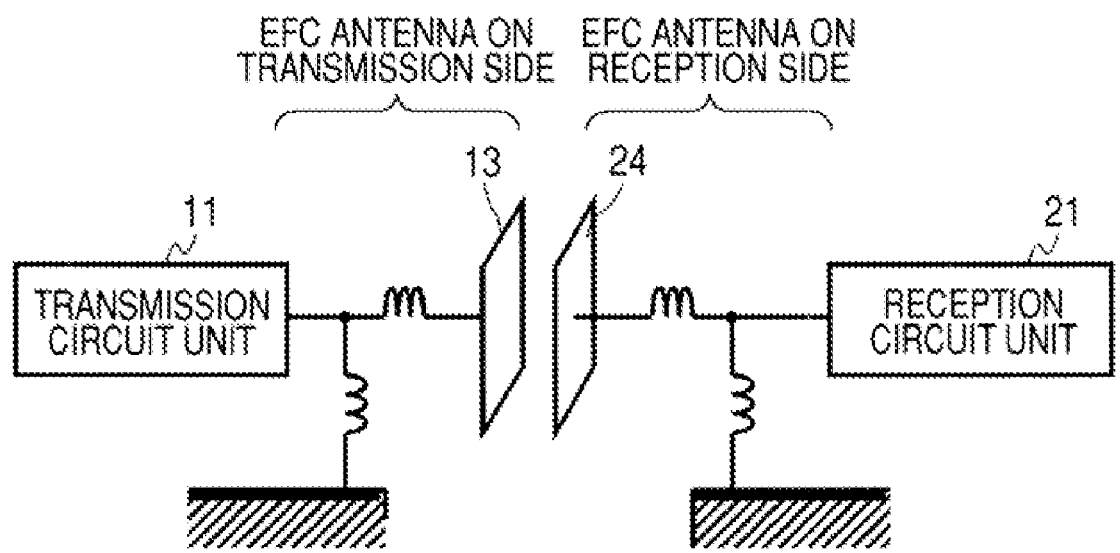
FIG. 24 is a diagram showing an example of a communication system that uses an electrostatic field or an induction field.

In FIG. 24, an example of a structure of a non-contact communication system that uses an electrostatic field or an induction field is shown. The communication system shown in the figure includes a transmitter 10 that performs data communication and a receiver 20 that performs data reception.

Electrodes 13 and 23 for transmission and reception provided in the transmitter 10 and the receiver 20, respectively, are arranged to be opposed to each other while being spaced apart by, for example, about 3 cm. It is possible to field-couple the electrodes 13 and 23. When a transmission request is sent from a higher order application, a transmission circuit unit 11 of the transmitter 10 generates an RF transmission signal such as a UWB signal on the basis of transmission data. The signal propagates from the transmission electrode 13 to the reception electrode 23. A reception circuit unit 21 of the receiver 20 subjects the RF signal received to demodulation and decoding processing and passes reproduced data to the higher order application.

According to the communication scheme in which an RF and a wideband are used such as the UWB communication, it is possible to realize ultra-high speed data transmission at about 100 Mbps in a short distance. When the UWB communication is performed by electric-field-coupling rather than radio wave communication, the field intensity of the electric-field-coupling is inversely proportional to the cube or the square of a distance. Thus, it is possible to form extremely low power radio, for which a license for a radio station is unnecessary, by controlling the field intensity (intensity of a radio wave) in a distance of 3 meters from radio equipment to be equal to or lower than a predetermined level. Therefore, it is possible to constitute a communication system inexpensively. When data communication is performed in a very short distance according to the electric-field-coupling scheme, there are advantages that a quality of a signal is not degraded by a reflection object present around a communication system and it is unnecessary to take into account prevention of hacking and ensuring of confidentiality on a transmission path.

On the other hand, since a propagation loss increases according to the length of a propagation distance with respect to a wavelength, it is necessary to keep the propagation loss sufficiently low when an RF signal is propagated by electric-field-coupling. In a communication scheme for transmitting a wideband signal of an RF such as a UWB signal according to electric-field-coupling, even if communication is very short distance communication in a distance of about 3 cm, since the distance is equivalent to about ½ wavelength for a frequency band in use of 4 GHz, this is an innegligible length. In particular, in an RF circuit, compared with a low-frequency circuit, the problem of characteristic impedance is more serious. An influence due to impedance mismatch becomes obvious at a coupling point between electrodes of a transmitter and a receiver.

In the non-contact communication of the past in which a frequency in a kHz or MHz band is used, since a propagation loss in a space is small, a transmitter and a receiver include EFC antenna formed by only electrodes. Even if coupling portions simply operate as parallel plate capacitors, it is possible to perform desired data transmission. On the other hand, in the case of non-contact communication in which an RF in a GHz band is used, since a propagation loss in a space is large, it is necessary to control reflection of a signal between EFC electrodes of a transmitter and a receiver and improve transmission efficiency. In the communication system shown in FIG. 24, even if an RF signal transmission path connecting the transmission circuit unit 11 and the transmission electrode 13 is a coaxial line impedance-matched at, for example, 50Ω, when the impedance in the coupling portion between the EFC electrode 13 on the transmission side and the EFC electrode 23 on the reception side is mismatched, a signal reflects to cause a propagation loss.

Figure 25:
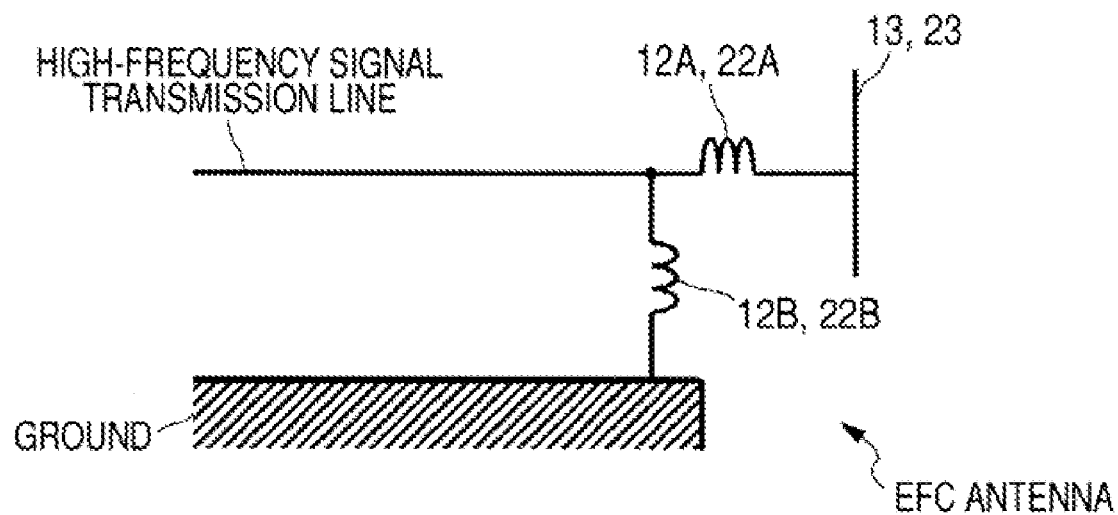
FIG. 25 is a diagram showing an example of a structure of EFC antennas arranged in a transmitter and a receiver, respectively.
Figure 26:
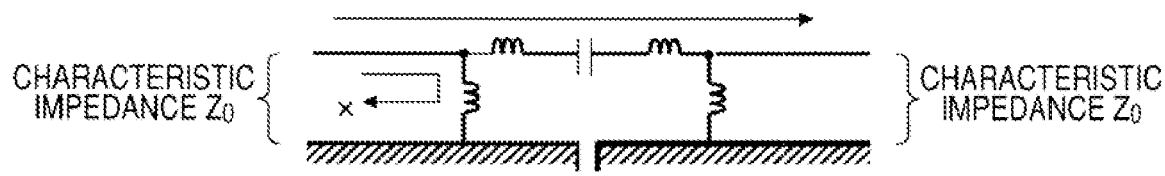
FIG. 26 is a diagram showing a state in which electrodes of the EFC antennas shown in FIG. 25 are arranged to face each other.

Thus, as shown in FIG. 25, EFC antenna arranged in the transmitter 10 and the receiver 20 are constituted by connecting the EFC electrodes 13 and 23 of a planar shape, series inductors 12A and 22A, and parallel inductors 12B and 22B to the RF signal transmission path. When such EFC antennas are arranged to face each other as shown in FIG. 26, the two electrodes operate as one capacitor and the EFC antennas operate like band-pass filters as a whole. Thus, it is possible to efficiently transmit an RF signal between the two EFC antennas. The RF signal transmission path in this context means a coaxial cable, a micro-strip line, a coplanar line, or the like.

In the non-contact communication system shown in FIG. 24, when an RF signal in the UWB or the like is transmitted by electric-field-coupling, conditions indispensable for the EFC antenna are as described below.

(1) There is an electrode for coupling by an electric field.
(2) There is a parallel inductor for coupling by a stronger electric field.
(3) In a frequency band used for communication, a constant of a capacitor formed by the inductor and the electrode is set such that the impedance is matched when EFC antennas are arranged to face each other.

Figure 27:
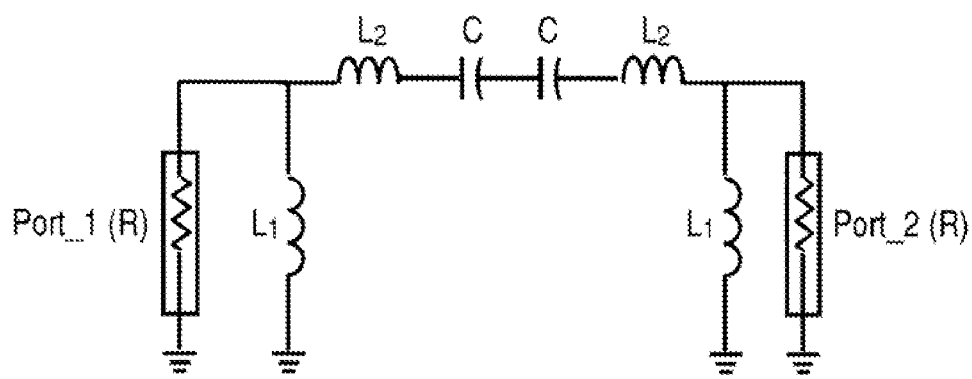
FIG. 27 is an equivalent circuit of a band-pass filter including a pair of EFC antennas.

It is possible to determine a passband of the band-pass filter including the pair of EFC antennas, in which the electrodes are opposed to each other as shown in FIG. 26, according to the inductances of the series inductor and the parallel inductor and the capacitance of the capacitor constituted by the electrodes. An equivalent circuit of the band-pass filter including the pair of EFC antennas is shown in FIG. 27. When a characteristic impedance is R[Ω], a center frequency is $f_0$ [Hz], a phase difference between an input signal and a pass signal is α [radian] (π<α<2π), and the capacitance of the capacitor constituted by the electrodes is C/2, it is possible to calculate respective constants of parallel and series inductances $L_1$ and $L_2$ constituting the band-pass filter using the following formula according to a working frequency $f_0$.

$$L_1 = -\frac{R(1 + \cos\alpha)}{2\pi f_0 \sin\alpha}[H] \qquad \text{[Formula 1]}$$

$$L_2 = \frac{1 + \pi f_0 CR\sin\alpha}{4\pi^2 f_0^2 C}[H]$$

Figure 28:
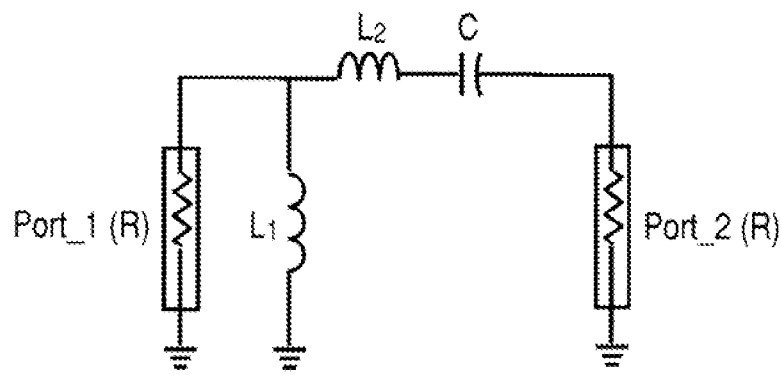
FIG. 28 is a diagram showing an equivalent circuit in the case in which the EFC antennas as a unit functions as an impedance converter.

When an EFC antenna as a unit functions as an impedance converter, an equivalent circuit of the impedance converter is as shown in FIG. 28. In a circuit diagram shown in the figure, by selecting the parallel inductance $L_1$ and the series inductance $L_2$ according to the working frequency $f_0$ to satisfy the following formula, it is possible to constitute an impedance converter that converts the characteristic impedance from $R_1$ to $R_2$.

$$L_1 = \frac{R_1}{2\pi f_0} \sqrt{\frac{R_2}{R_1 - R_2}} \, [H]$$

$$L_2 = \frac{1}{4\pi^2 f_0^2} \left( \frac{1}{C} - 2\pi f_0 \sqrt{R_2(R_1 - R_2)} \right) [H]$$

$$R_1 > R_2$$

[Formula 2]

Figure 23:
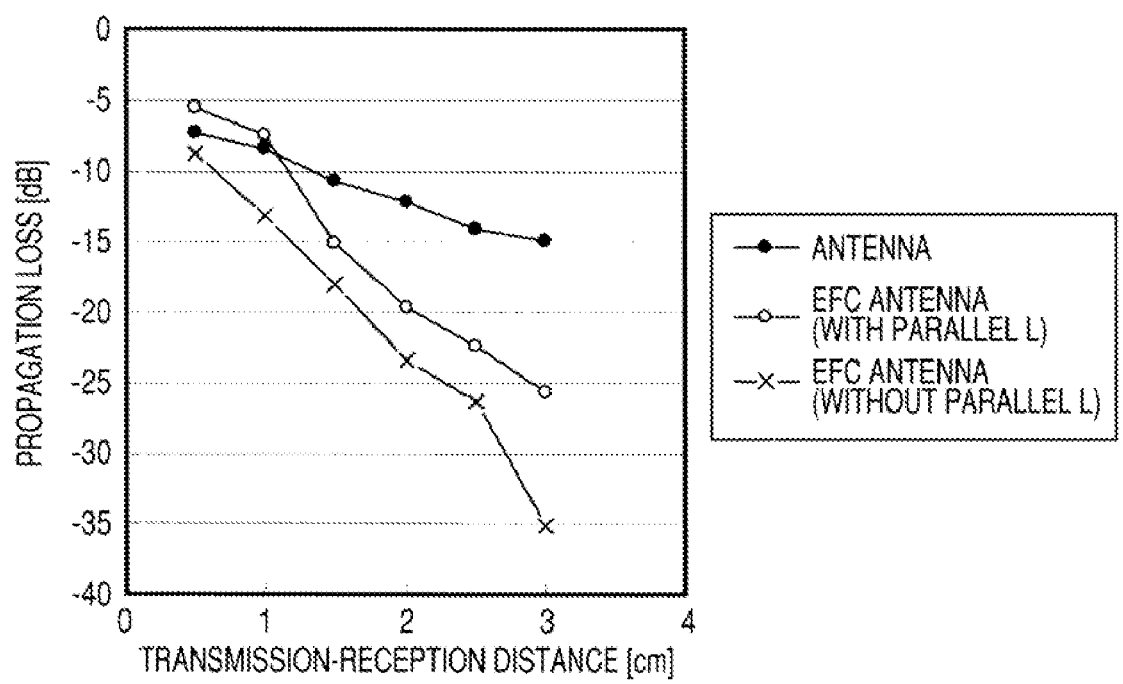
FIG. 23 is a graph showing a result obtained by placing an antenna, an EFC antenna (with a parallel inductor), and an EFC antenna (without a parallel inductor) to face one another and measuring a propagation loss while changing a distance.

In FIG. 23, a result obtained by placing an antenna, an EFC antenna (with a parallel inductor), and an EFC antenna (without a parallel inductor) to face one another and measuring a propagation loss while changing a distance is shown.

The EFC antenna (with the parallel inductor) has a characteristic that the EFC antenna firmly couples in a short distance up to a distance of about 1 cm and has a small propagation loss but, as a distance increases, rapidly attenuates and does not cause interference with other systems. On the other hand, in the antenna, a propagation loss is not as large as that in the case of the EFC antenna (with the parallel inductor). Thus, it is likely that a signal interfering with the other radio systems is formed. In the EFC antenna without the parallel inductor, propagation efficiency is low and a propagation loss is large even when a communication partner is present nearby.

The EFC electrode of the EFC antenna is connected to the RF transmission line such as a coaxial cable, a micro-strip line, or a coplanar line. The "EFC antenna" in this specification solves the problem peculiar to the RF circuit.

In this way, in the non-contact communication system shown in FIG. 24, a transceiver that performs the UWB communication can realize very short distance data transmission having an unprecedented characteristic by using the EFC antenna shown in FIG. 25 in a transceiver of the radio waveform communication scheme of the past instead of using an antenna.

Here, the resonating section 12 (or the RF transmission line) including the series inductor is connected to the center of the transmission electrode 13. This is because, when the RF transmission line is connected to the center of the electrode, an electric current uniformly flows in the electrode 13 and the electrode 13 does not radiate an unnecessary radio wave to the front of the electrode 13 in a direction substantially perpendicular to the electrode surface (see FIG. 21A) but, when the resonating section 12 is connected to a position offset from the center of the electrode 13, an unequal electric current flows in the electrode 13 and the electrode 13 operates like a micro-strip antenna to radiate an unnecessary radio wave (see FIG. 21B).

Figure 22:
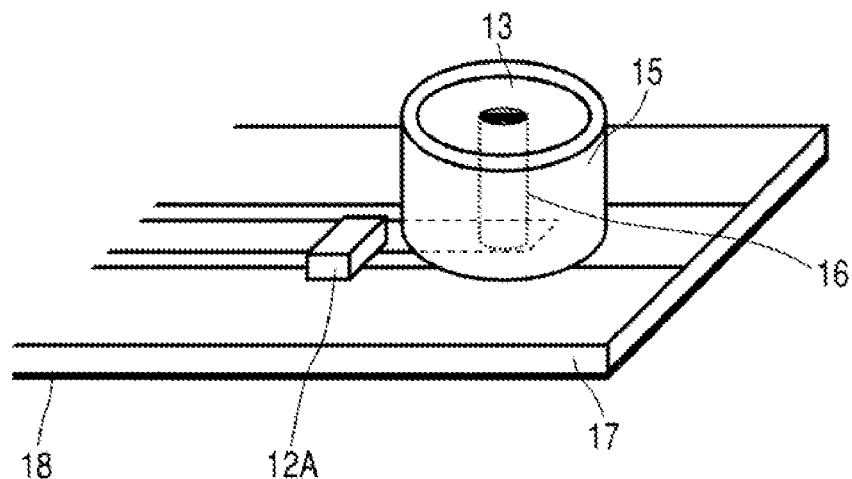
FIG. 22 is a diagram showing an example of an actual structure of an EFC antenna shown in FIG. 4.

An example of an actual structure of the EFC antenna shown in FIG. 25 is shown in FIG. 22. In the example in the figure, the EFC antenna of the transmitter 10 is shown. However, the EFC antenna is constituted in the same manner in the receiver 20. In the figure, the electrode 13 is disposed on an upper surface of the dielectric 15 of a columnar shape. The electrode 13 is electrically connected to the signal line on a printed board 17 through a through-hole 16 piercing through the dielectric 15. It is possible to manufacture the EFC antenna shown in the figure by forming a through-hole in a dielectric of a columnar shape having a desired height and, then, forming a conductor pattern, which should be an EFC electrode, on an upper end face of this column, filling a conductor in the through-hole, and mounting this dielectric on a printing board with reflow solder or the like.

By appropriately adjusting the height from a circuit mounting surface of the printed board 17 to the electrode 13, i.e., the length of the through-hole 16 according to a wavelength in use, the through-hole 16 acquires inductance. Thus, it is possible to substitute the through-hole 16 for the series inductor 12B. The signal line is connected to a ground 18 via the parallel inductor 12A of a chip shape. Although not shown in the figure, it is also possible to substitute the wiring pattern on the printed board for the chip of the parallel inductor. This kind of inductor includes a distributed constant circuit and is hereinafter also referred to as "stub".

The dielectric 15 and the through hole 16 play both a role of preventing coupling of the electrode 13 and the ground 18 and a role of forming the series inductor 12B. By constituting an inductor equivalent to the series inductor 12B with sufficient height secured from the circuit mounting surface of the printed board 17 to the electrode 13, electric-field-coupling of the ground 18 and the electrode 13 is prevented and a function of the EFC antenna (i.e., an action for electric-field-coupling with the EFC antenna of the receiver) is secured. However, when the height of the dielectric 15 is large, i.e., a distance from the circuit mounting surface of the printed board 17 to the electrode 13 is innegligible length with respect to the wavelength in use, there is a bad effect that the series inductor 12B, i.e., the resonating section 12, acts as an antenna and radiates a radio wave. A radiated radio wave due to behavior of the EFC antenna as an antenna in the resonating section 12 has attenuation with respect to a distance smaller than that of an electrostatic magnetic field. Thus, it is difficult to control the radiated radio wave to extremely low power radio in which the field intensity at a distance of three meters from the radio equipment is equal to or lower than a predetermined level. Therefore, as conditions of the height of the dielectric 15, the height is enough for preventing coupling with the ground 18 and sufficiently obtaining a characteristic of the EFC antenna, constituting the series inductor 12B necessary to act as a resonator, and preventing an action of the resonating section including this series inductor 12B as an antenna from being large.

In general, since metal prevents efficient radiation of a radio wave of an antenna, it is difficult to arrange metal such as a ground near a radiation element of the antenna. On the other hand, in the communication system according to this embodiment, even if metal is arranged on a rear surface side of the electrode 13, a characteristic of the EFC antenna is not deteriorated. It is possible to form the antenna smaller than the antenna of the past by appropriately selecting constants of the series inductor 12B and the parallel inductor 12A. Since an electrostatic field does not have polarization unlike the antenna, it is possible to secure a uniform communication quality even if a direction thereof changes.

Figure 3:
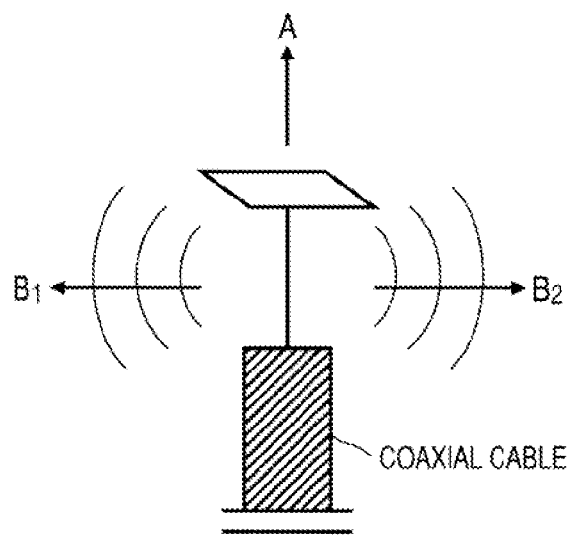
FIG. 3 is a diagram showing an example of a structure of a capacity loaded antenna.

In the field of radio wave communication, a "capacity loaded" antenna, the height of which is reduced by attaching metal to the tip of an antenna element as shown in FIG. 3 to give an electrostatic capacitance to the antenna, is generally known. The antenna has a structure similar to that of the EFC antenna shown in FIG. 25 at a glance. A difference between the EFC antenna and the capacity loaded antenna used in the transmitter and the receiver in this embodiment will be explained.

The capacity loaded antenna shown in FIG. 3 radiates a radio wave in directions $B_1$ and $B_2$ around a radiation element of the antenna. However, a direction A is a null point in which a radio wave is not radiated. Examining electric fields generated around the antenna in detail, a radiation-electric-field that attenuates in inverse proportion to a distance from the antenna, an induction field that attenuates in inverse proportion to the square of the distance from the antenna, and an electrostatic field that attenuates in inverse proportion to the cube of the distance from the antenna are generated. Since the induction field and the electrostatic field rapidly attenuate according to a distance compared with the radiation-electric-field, in a normal radio system, only the radiation-electric-field is discussed and the induction field and the electrostatic field are often neglected. Therefore, although the capacity loaded antenna shown in FIG. 3 generates the induction field and the electrostatic field in the direction A, since the induction field and the electrostatic field quickly attenuate in the air, the induction field and the electrostatic field are not positively used in radio wave communication.

Figure 19:
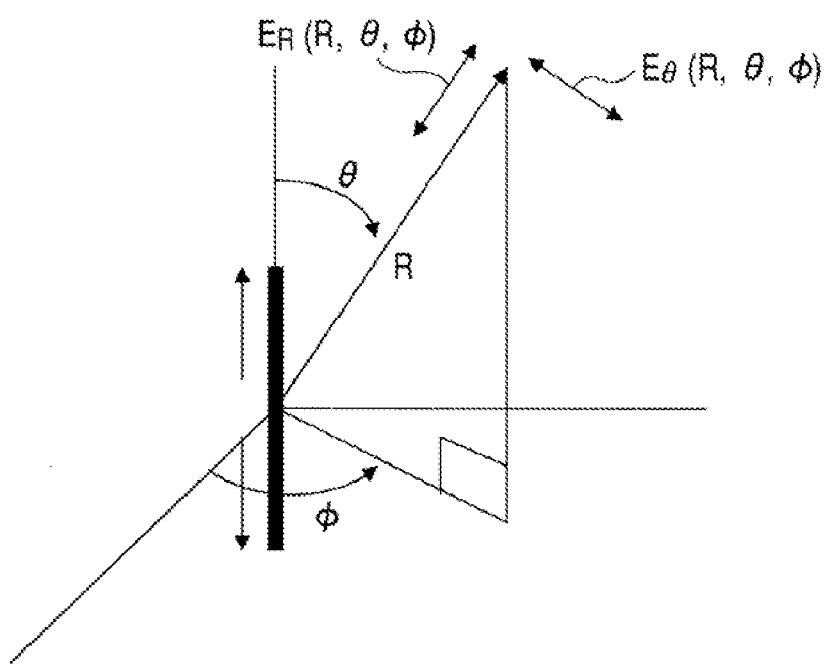
FIG. 19 is a diagram showing an electric field component (a transversal component) $E_\theta$ oscillating in a direction perpendicular to a propagation direction and an electric field component (a longitudinal component) $E_R$ oscillating in a direction parallel to the propagation direction.
Figure 29:
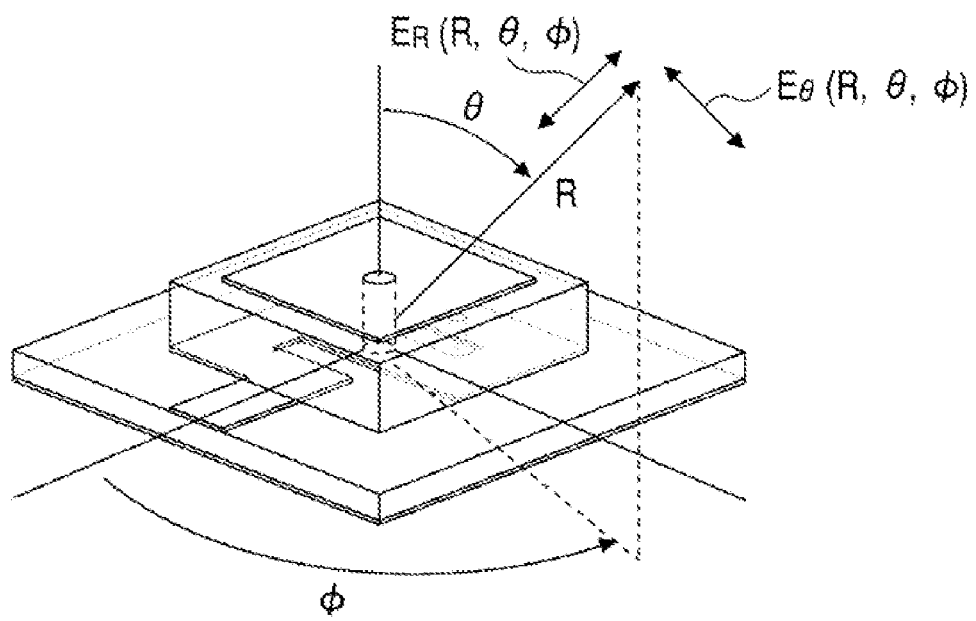
FIG. 29 is a diagram showing a state in which an electromagnetic field formed by an infinitesimal dipole antenna is mapped on an EFC electrode.

An electromagnetic field generated in the EFC electrode in the transmitter will be considered. An electromagnetic field generated by an infinitesimal dipole antenna is shown in FIG. 19. In FIG. 29, this electromagnetic field is mapped on an EFC electrode. As shown in the figure, the electromagnetic field is roughly divided into an electric field component (a transversal component) $E_\theta$ oscillating in a direction perpendicular to a propagation direction and an electric field component (a longitudinal component) $E_R$ oscillating in a direction parallel to the propagation direction. A magnetic field $H\phi$ is generated around the infinitesimal dipole antenna. The following formula represents the electromagnetic field generated by the infinitesimal dipole antenna. However, since an arbitrary current distribution is regarded as a continuous collection of such infinitesimal dipole antennas, an electromagnetic field induced by the current distribution has the same characteristic (see, for example, Yasuhito Mushiake "Antenna/Radio Wave Propagation" (Corona Publishing Co., Ltd., pp 16 to 18).

$$E_\theta = \frac{pe^{-jkR}}{4\pi\varepsilon}\left(\frac{1}{R^3} + \frac{jk}{R^2} - \frac{k^2}{R}\right)\sin\theta \qquad \text{[Formula 3]}$$

$$E_R = \frac{pe^{-jkR}}{2\pi\varepsilon}\left(\frac{1}{R^3} + \frac{jk}{R^2}\right)\cos\theta$$

$$H_\phi = \frac{j\omega pe^{-jkR}}{4\pi}\left(\frac{1}{R^2} + \frac{jk}{R}\right)\sin\theta$$

As it is seen from the above formula, the transversal component of the electric field includes a component inversely proportional to a distance (a radiation-electric-field), a component inversely proportional to the square of the distance (an induction field), and a component inversely proportional to the cube of the distance (an electrostatic field). The longitudinal component of the electric field includes only the component inversely proportional to the square of the distance (the induction field) and the component inversely proportional to the cube of the distance (the electrostatic field) and does not include the component of the radiation-magnetic-field. The electric field $E_R$ is maximum in a direction in which $|\cos\theta|=1$, i.e., an arrow direction in FIG. 19.

In the radio wave communication widely used in radio communication, a radio wave radiated from an antenna is the transversal wave $E_\theta$ oscillating in a direction orthogonal to a traveling direction of the radio wave. The radio wave may be unable to communicate when a direction of polarization is orthogonal thereto. On the other hand, an electromagnetic wave radiated from the EFC electrode in the communication scheme in which an electrostatic field and an induction field are used includes, other than the transversal wave $E_\theta$, the longitudinal wave $E_R$ oscillating in the traveling direction. The longitudinal wave $E_R$ is also referred to as "surface wave". The surface wave can also propagate through the inside of a medium such as a conductor, a dielectric, or a magnetic body (described later).

In the non-contact communication system, it is also possible to transmit a signal using a component of any one of the radiation-electric-field, the electrostatic field, and the induction field as a medium. However, the radiation-electric-field inversely proportional to a distance is likely to be a wave interfering with other systems in a relatively long distance. Therefore, it is preferable to perform non-contact communication in which the longitudinal wave $E_R$ not including the component of the radiation-electric-field is used while controlling the component of the radiation-electric-field, in other words, controlling the transversal wave $E_\theta$ including the component of the radiation-electric-field.

Figure 21A:
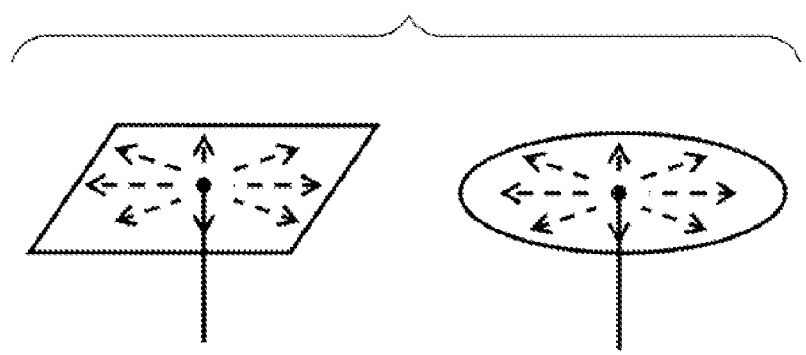
FIG. 21A is a diagram showing a state of an electric current that flows in an electrode of an EFC antenna when an RF transmission line is connected to the center of the electrode.
Figure 21B:
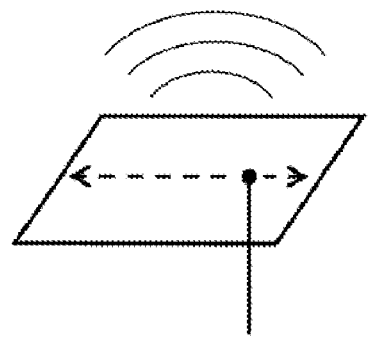
FIG. 21B is a diagram showing a state in which an unequal electric current flows in the electrode of the EFC antenna to radiate an unnecessary radio wave when the RF transmission line is connected to a position offset from the center of the electrode.

From the viewpoint described above, ideas described below are introduced into the EFC antenna according to this embodiment. First, it is seen from Formula 3 indicating an electromagnetic field that, when there is a relation $\theta=0°$, $E_\theta=0$ and the $E_R$ component takes a maximum value. In other words, $E_\theta$ is the maximum in a direction perpendicular to a direction in which an electric current flows and $E_R$ is the maximum in a direction parallel to the direction in which the electric current flows. Therefore, to maximize $E_R$ in a front direction perpendicular to the electrode surface, it is desirable to set a current component in a direction perpendicular to the electrode large. On the other hand, when a feeding point is offset from the center of the electrode, a current component in a direction parallel to the electrode increases because of this offset. The $E_\theta$ component in the front direction of the electrode increases according to this current component. Therefore, in the EFC antenna according to this embodiment, as shown in FIG. 21A, the feeding point is provided in a substantially center position of the electrode (described above) to maximize the $E_R$ component.

It goes without saying that, in the antenna of the past, not only a radiation-electric-field but also an electrostatic field and an induction field are generated and electric-field-coupling occurs if a transmission antenna and a reception antenna are brought close to each other. However, most of energy is discharged as a radiation-electric-field. This is not efficient as non-contact communication. On the other hand, in the EFC antenna shown in FIG. 25, the EFC electrode and the resonating section are constituted to form the strong electric field $E_R$ and improve transmission efficiency in a predetermined frequency.

When the EFC antenna shown in FIG. 25 is used in the transmitter alone, the electric component $E_R$ of the longitudinal wave is generated on the surface of the EFC electrode. However, since the transversal component $E_\theta$ including the radiation-electric-field is small compared with $E_R$, a radio wave is hardly radiated. In other words, a wave interfering with other systems nearby is not generated. Most signals inputted to the EFC antenna are reflected by the electrode and return to an input terminal.

On the other hand, when the pair of EFC antennas are used, i.e., when the EFC antennas are arranged in a short distance between the transmitter and the receiver, the EFC electrodes are coupled mainly by a quasi-electrostatic field component and act like one capacitor, and EFC antennas operate like a band-pass filter. The impedances of the EFC electrodes are matched. Therefore, in a passband, most of signals and electric power are transmitted to a communication partner and are not reflected to the input terminal. "Short distance" in this context is defined by a wavelength $\lambda$ and is equivalent to a distance "d" between the EFC electrodes<<λ/2π. For example, when the working frequency $f_0$ is 4 GHz, the inter-electrode distance is equal to or smaller than 10 mm.

When the EFC antennas are arranged in a medium distance between the transmitter and the receiver, the electrostatic field attenuates and the longitudinal wave of the electric field $E_R$ mainly formed of the induction field is generated around the EFC electrode of the transmitter. The longitudinal wave of the electric field $E_R$ is received by the EFC electrode of the receiver and a signal is transmitted. However, compared with the case in which both the EFC antennas are arranged in a short distance, in the EFC antennas of the transmitter, a ratio of an inputted signal being reflected by the electrode and returning to the input terminal is high. "Medium distance" in this context is defined by the wavelength λ. When the distance "d" between the EFC electrodes is about 1 to several times as large as λ/2π and the working frequency $f_0$ is 4 GHz, the medium distance means the inter-electrode distance of 10 to 40 mm.

In the communication scheme in which an electrostatic field or an induction field is used, since the field intensities rapidly attenuate in inverse proportion to the cube and the square of a distance, a communication range is limited to a very short distance. Moreover, when an RF signal of the UWB communication or the like is used, since the RF signal has a short wavelength, a propagation loss is large. Therefore, it is necessary to bring the electrodes (the EFC antennas) of the transmitter and the receiver into close contact with each other as much as possible. It is difficult to perform communication in a long distance. In order to bring the electrodes close to each other, it is necessary to perform fine positioning between the electrodes. Thus, positions of the electrodes have to be held during data communication and convenience of use for the user is not high.

On the other hand, in the communication system according to the embodiment of the present invention, it is possible to dispose the surface wave transmission line made of a conductor such as a metal wire between the EFC electrode of the transmitter and the EFC electrode of the receiver and efficiently propagate a surface wave among electromagnetic waves radiated from the EFC electrode of the transmitter through the inside and the surface of this surface wave transmission line. Therefore, even if the EFC electrodes of the transmitter and the receiver are spaced apart a relatively long distance, it is possible to transmit a surface wave radiated by electric-field-coupling with a low propagation loss and perform data communication. It is unnecessary to bring the EFC electrodes of the transmitter and the receiver into direct close contact with each other.

Among carrier waves generated by using an electromagnetic field, a carrier wave having a phase velocity "v" lower than a light velocity "c" is referred to as a slow wave and a carrier wave having the phase velocity "v" higher than the light velocity "c" is referred to as a fast wave. A surface wave is equivalent to the slow wave. In an infinite transmission path in a slow wave structure, energy concentrates in and transmitted through the transmission path and radiation to the outside does not occur (see, for example, Tasuku Teshirogi and Tsutomu Yoneyama, "New Millimeter Wave Technique" (Ohmsha, Ltd., p 119). The surface wave in this context is equivalent to the longitudinal wave $E_R$, which is a component oscillating in a direction parallel to a propagation direction, in an electric field generated from the EFC electrode (described above). The surface wave propagating through the transmission path includes a "surface mode" in which energy concentrates near the surface of the transmission path and a "volume mode" in which energy concentrate in the center of the transmission path. A mechanism of an electromagnetic wave propagating along the surface of a conductor or a dielectric is known as, for example, "Goubau line" or "G line" (see, for example, U.S. Pat. Nos. 2,685,068 and 2,921,277).

For example, JP-A-2004-297107 proposes a power-line carrier apparatus that can transmit an RF signal with a surface wave of a power line or a distribution line and control a radiated radio wave to be small enough for satisfying the provision of the radio wave law (however, in the apparatus described in JP-A-2004-297107, an EFC antenna that couples an electromotive force induced from winding applied with an RF signal to the power line is used. This is different from the present invention in which an electromagnetic wave radiated from the EFC electrode by an electrostatic magnetic field is propagated on the surface wave transmission line (described later)). Concerning details of a mechanism of the surface wave transmission line for propagating an electromagnetic wave, see, for example, Masamitsu Nakajima "Micro Wave Engineering" (Morikita Publishing Co., Ltd., pp 182 to 190).

In FIG. 1, an example of a structure of a non-contact communication system in which a surface wave transmission line is interposed between EFC electrodes of a transmitter and a receiver is shown. The communication system shown in the figure includes the transmitter 10 that performs data transmission, the receiver 20 that performs data reception, and the surface wave transmission line 30 that transmits a surface wave radiated from the transmission electrode 13 of the transmitter 10 with a low propagation loss. The surface wave transmission line 30 is made of a metal wire such as a copper wire and is disposed along a traveling direction of the surface wave radiated from the transmission electrode 13.

When a transmission request is sent from a higher order application, the transmission circuit unit 11 of the transmitter 10 generates an RF transmission signal such as a UWB signal on the basis of transmission data. The signal outputted from the transmission circuit unit 11 resonates in the resonating section 12 and is radiated from the transmission electrode 13 as a surface wave.

The surface wave radiated from the transmission electrode 13 efficiently propagates through the interposition of the surface wave transmission line 30 and is inputted to the reception circuit unit 21 from the reception electrode 23 of the receiver 20 through the resonating section 22. The reception circuit unit 21 applies modulation and decoding processing to the RF signal received and passes reproduced data to the higher order application.

Through the interposition of the surface wave transmission line 30, the signal efficiently propagates from the transmission electrode 13 to the reception electrode 23. In order to acquire the surface wave radiated from the transmission electrode 13 without waste, it is desirable to arrange the end face of the surface wave transmission line 30 made of a metal wire in the front of the transmission electrode 13 to be perpendicular to the electrode surface.

Figure 2:
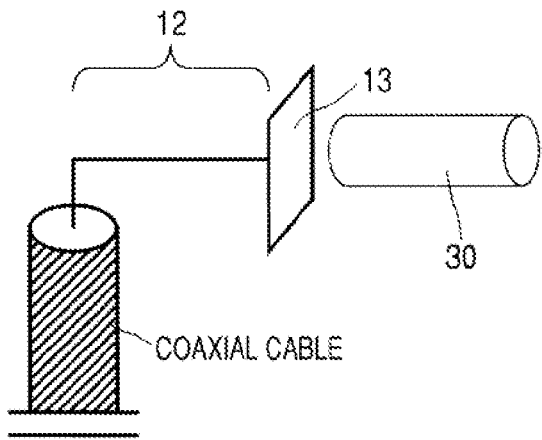
FIG. 2 is a diagram showing an example of a structure of a surface-wave transmitting section of a transmitter 10.

In FIG. 2, an example of a structure of a surface-wave transmitting section of the transmitter 10 is shown. It should be understood that a structure of a surface wave receiving section of the receiver 20 is the same.

As shown in the figure, a resonating section of a linear conductor having a predetermined length and an electrode are attached to the tip portion of an RF signal line including a coaxial cable. By designing the resonating section 12 and the transmission electrode 13 to have the length of ¼ of a wavelength of a predetermined frequency as the resonating section 12 and the transmission electrode 13 as a whole, it is possible to cause the resonating section 12 and the transmission electrode 13 to resonate at the predetermined frequency and generate a surface wave of the frequency. Usually, the surface wave generated rapidly attenuates in the air according to an increase in a distance. However, by connecting the resonating section 12 to the center of the transmission electrode 13 at the tip and setting the surface wave transmission line 30 made of a metal wire in the front of the electrode in a direction substantially perpendicular to a radiation surface of the electrode, it is possible to acquire the surface wave transmitted from the transmission electrode 13 with the metal wire to form a surface wave transmitter (or an EFC antenna).

The surface wave transmission line 30 made of a conductor of metal or the like is arranged in the front of the transmission electrode 13, which has large intensities of an induction field and an electrostatic field, in a position perpendicular to the electrode surface. When an induction field and an electrostatic field generated near the electrode 13 are acquired on the end face of the surface wave transmission line 30, the induction field and the electrostatic field propagates in this transmission line 30 and is inputted to the reception electrode 23 of the receiver 20. In other words, by transmitting the electromagnetic field radiated from the electrode 13 of the transmitter 10 in the surface wave transmission line 30 as a surface wave, it is possible to perform data communication using the surface wave.

Figure 4:
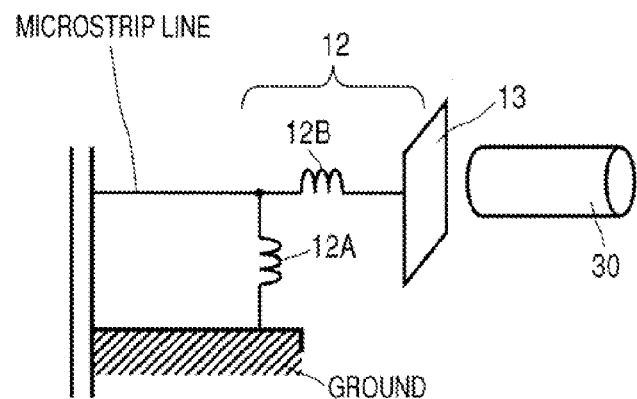
FIG. 4 is a diagram showing an example of another structure of the surface-wave transmitting section of the transmitter 10.

In FIG. 4, an example of another structure of the surface-wave transmitting section of the transmitter 10 is shown. It should be understood that a structure of the surface-wave receiving section of the receiver 20 can be constituted in the same manner.

In each of the surface-wave transmitting section and the surface-wave receiving section, the resonating section 12 made of the lumped constant circuit is disposed using a coil, a capacitor, or the like instead of the linear conductor. In the example shown in FIG. 4, the resonating section 12 includes the parallel inductor 12A connected between the signal line of the RF transmission line from the transmission circuit unit 11 and the ground and the series inductor 12B connected between the signal line and the electrode. Since a strong electric field is generated in the front of the electrode, it is possible to efficiently generate a surface wave.

In the transmitter and the receiver, when the pair of EFC antennas shown in FIG. 4 are arranged to face each other via the surface wave transmission line, the two electrodes operate as one capacitor and the EFC antennas operate like a band-pass filter as a whole. Here, by adjusting a constant of the series inductor 12B, a constant of the parallel inductor 12B, and a constant of the capacitor including the electrodes 13 and 23, it is possible to design the EFC antennas such that the impedance in the coupling portion is continuous (described above).

Figure 30:
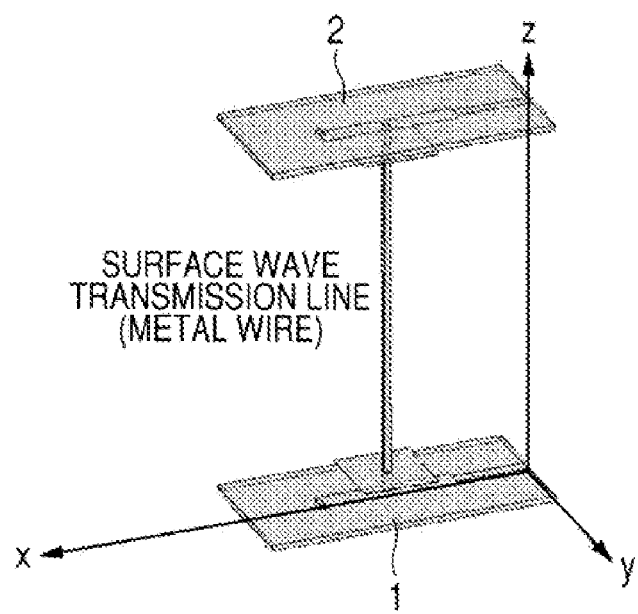
FIG. 30 is a diagram showing a state in which transmission of an RF signal is performed by interposing a surface wave transmission line made of a metal wire between two opposed EFC antennas 1 and 2.
Figure 31A:
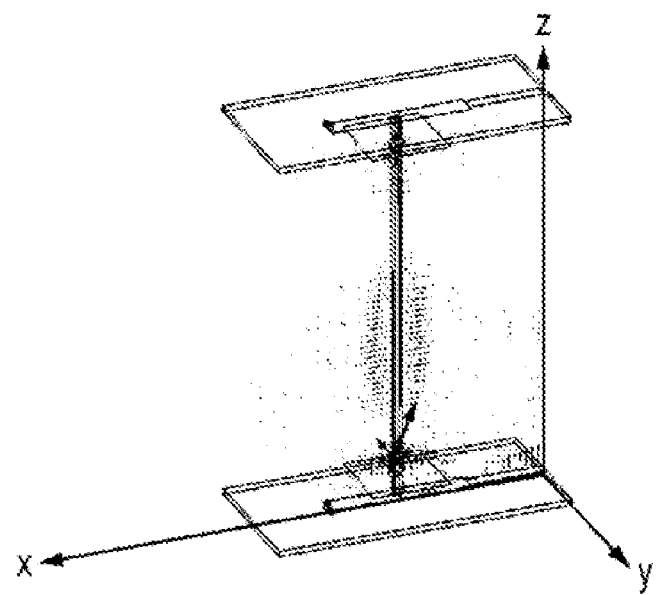
FIG. 31A is a diagram showing, for a half period at intervals of 1/12 period, a change in an electric field distribution in a zx plane in the case in which the RF signal is transmitted by interposing the surface wave transmission line in the structure shown in FIG. 30.
Figure 31B:
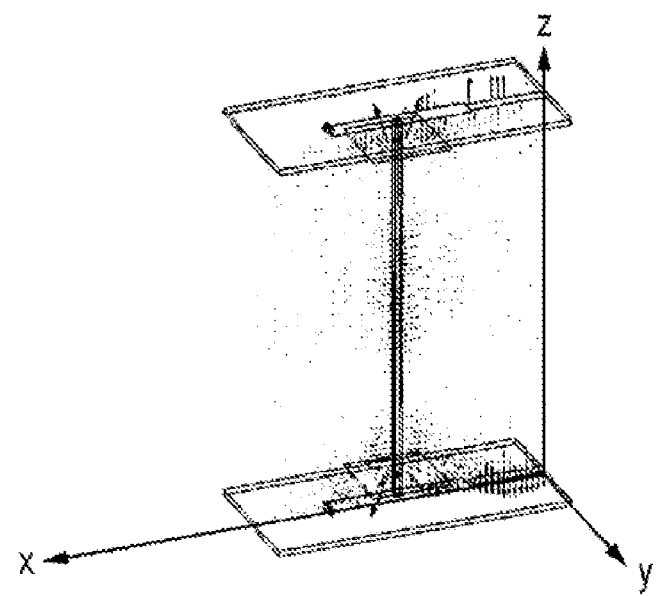
FIG. 31B is a diagram showing, for a half period at intervals of 1/12 period, a change in the electric field distribution in the zx plane in the case in which the RF signal is transmitted by interposing the surface wave transmission line in the structure shown in FIG. 30.
Figure 31C:
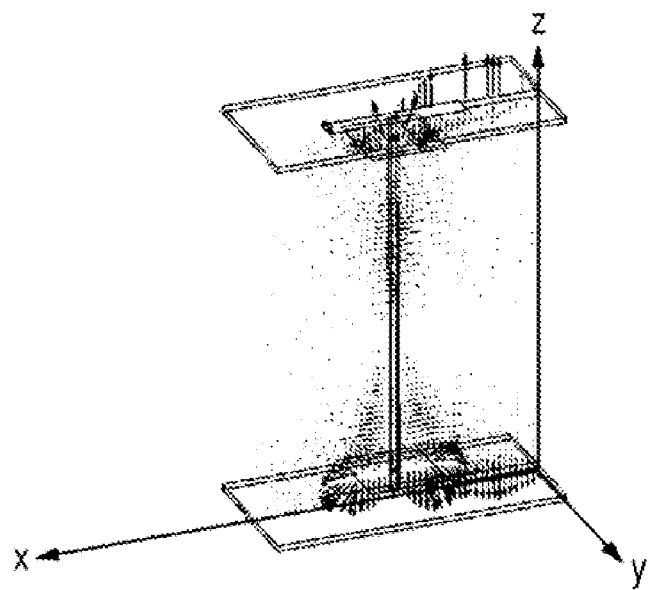
FIG. 31C is a diagram showing, for a half period at intervals of 1/12 period, a change in the electric field distribution in the zx plane in the case in which the RF signal is transmitted by interposing the surface wave transmission line in the structure shown in FIG. 30.
Figure 31D:
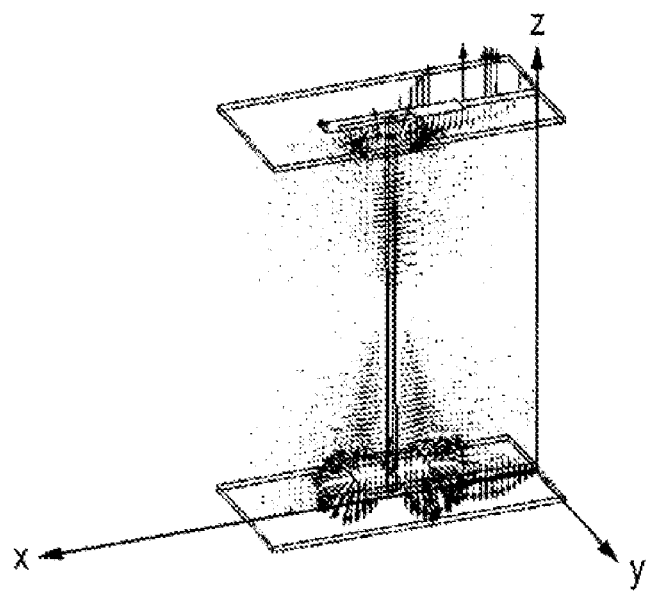
FIG. 31D is a diagram showing, for a half period at intervals of 1/12 period, a change in the electric field distribution in the zx plane in the case in which the RF signal is transmitted by interposing the surface wave transmission line in the structure shown in FIG. 30.
Figure 31E:
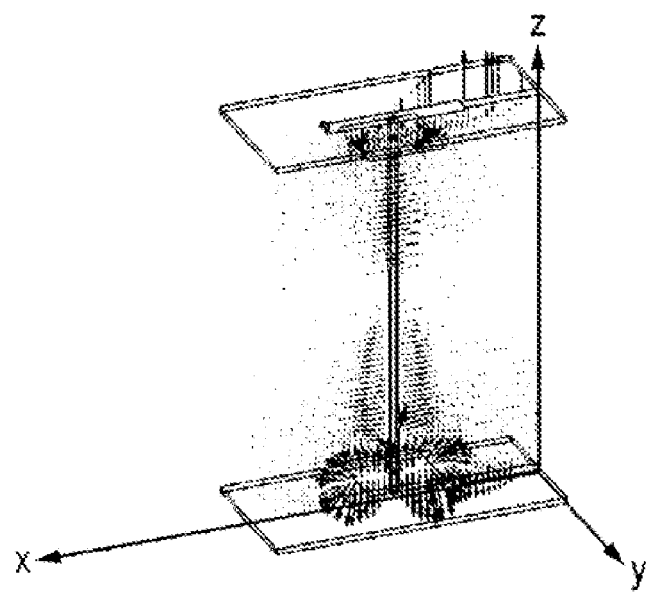
FIG. 31E is a diagram showing, for a half period at intervals of 1/12 period, a change in the electric field distribution in the zx plane in the case in which the RF signal is transmitted by interposing the surface wave transmission line in the structure shown in FIG. 30.
Figure 31F:
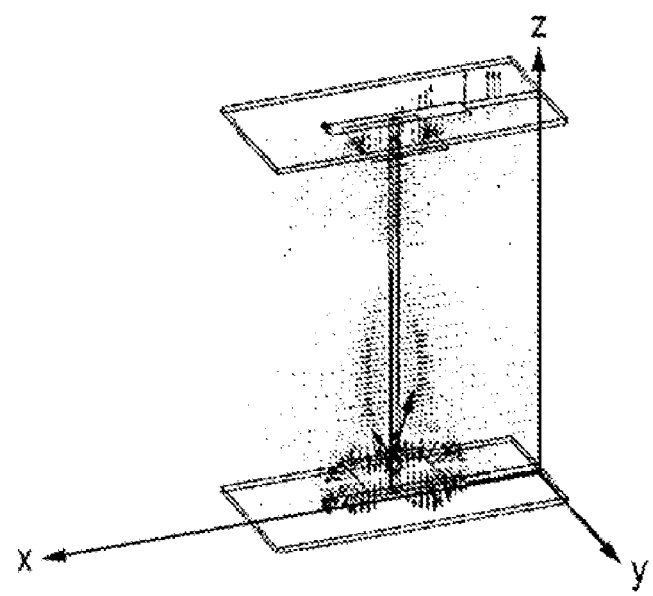
FIG. 31F is a diagram showing, for a half period at intervals of 1/12 period, a change in the electric field distribution in the zx plane in the case in which the RF signal is transmitted by interposing the surface wave transmission line in the structure shown in FIG. 30.
Figure 32A:
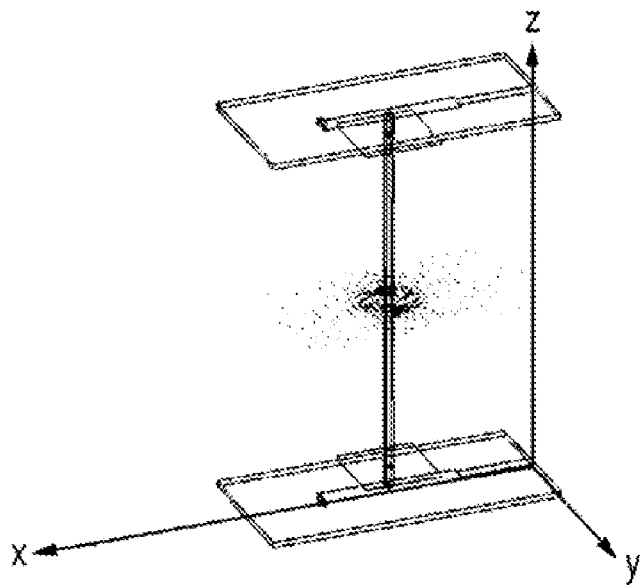
FIG. 32A is a diagram showing, for a half period at intervals of 1/12 period, a change in an electric field distribution in an xy plane in the case in which the RF signal is transmitted by interposing the surface wave transmission line in the structure shown in FIG. 30.
Figure 32B:
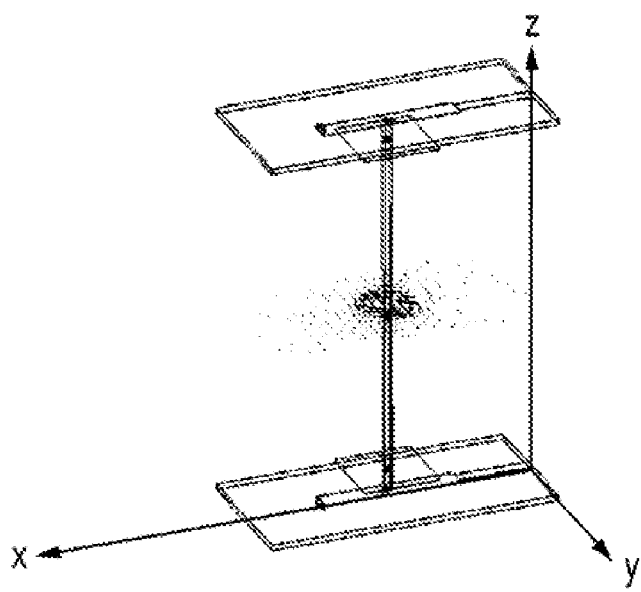
FIG. 32B is a diagram showing, for a half period at intervals of 1/12 period, a change in the electric field distribution in the xy plane in the case in which the RF signal is transmitted by interposing the surface wave transmission line in the structure shown in FIG. 30.
Figure 32C:
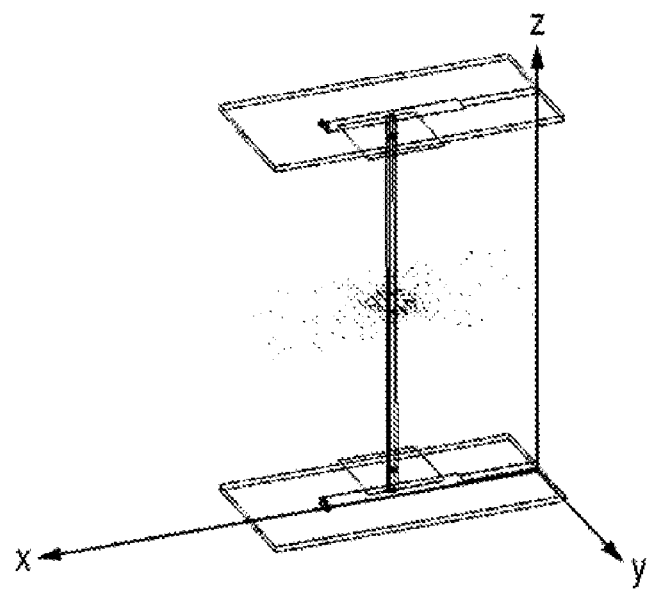
FIG. 32C is a diagram showing, for a half period at intervals of 1/12 period, a change in the electric field distribution in the xy plane in the case in which the RF signal is transmitted by interposing the surface wave transmission line in the structure shown in FIG. 30.
Figure 32D:
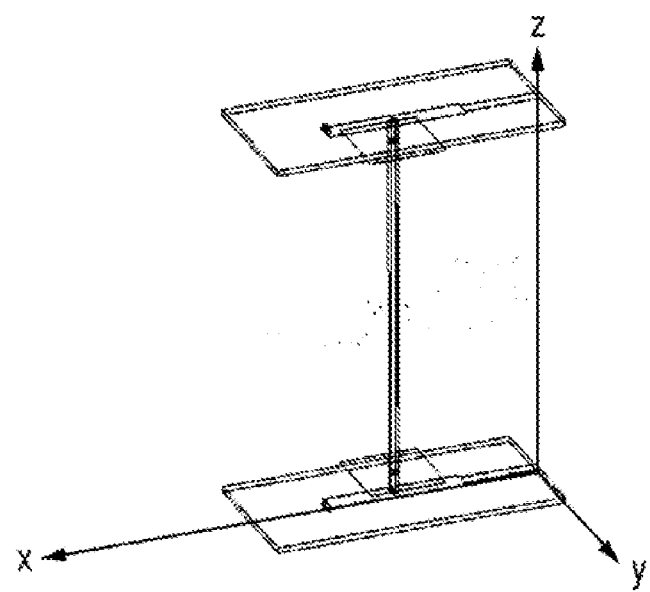
FIG. 32D is a diagram showing, for a half period at intervals of 1/12 period, a change in the electric field distribution in the xy plane in the case in which the RF signal is transmitted by interposing the surface wave transmission line in the structure shown in FIG. 30.
Figure 32E:
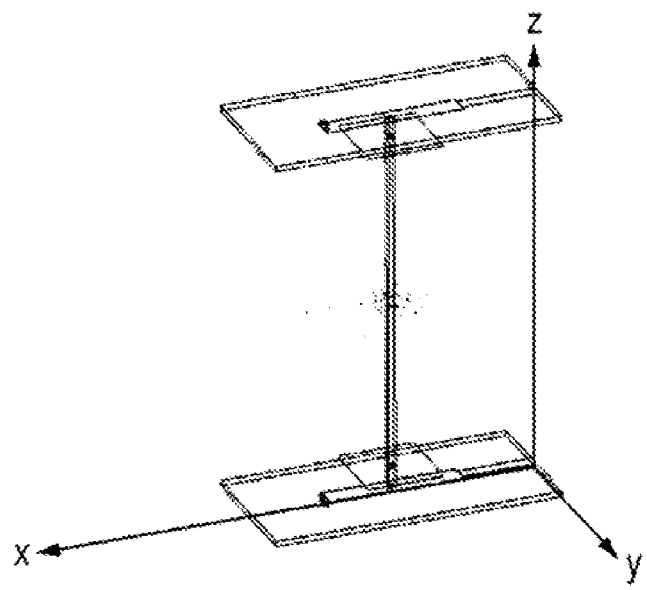
FIG. 32E is a diagram showing, for a half period at intervals of 1/12 period, a change in the electric field distribution in the xy plane in the case in which the RF signal is transmitted by interposing the surface wave transmission line in the structure shown in FIG. 30.
Figure 32F:
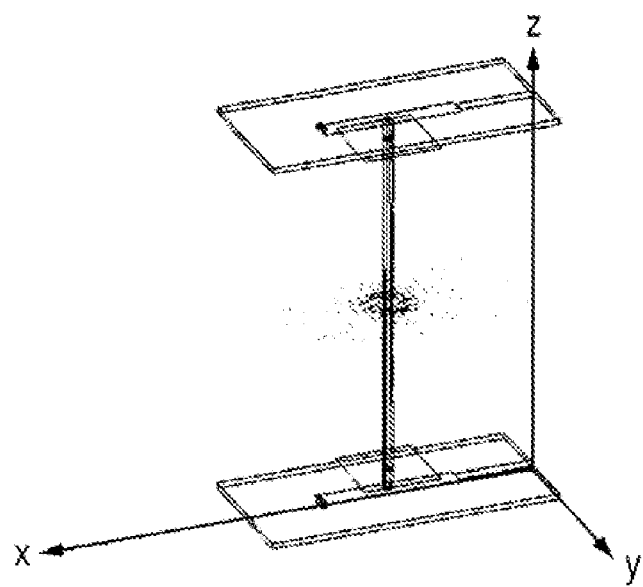
FIG. 32F is a diagram showing, for a half period at intervals of 1/12 period, a change in the electric field distribution in the xy plane in the case in which the RF signal is transmitted by interposing the surface wave transmission line in the structure shown in FIG. 30.

The inventors calculated, in a simulation in which a finite element method was used, an electromagnetic field distribution generated around a surface wave transmission line made of a metal wire when an RF signal was transmitted by interposing the surface wave transmission line between opposed two EFC antennas 1 and 2 as shown in FIG. 30. As the surface wave transmission line, a conductor having an electric conductivity of 58,000,000 [Siemens/m] was assumed. A sectional area of the surface wave transmission line was set to 1 mm×1 mm, the length thereof was set to 49.6 mm, a gap between both the end faces of the surface wave transmission line and an EFC electrode was set to 50 mm, and a working frequency was set to 4.5 GHz. Each of the EFC antennas includes an EFC electrode having an area of 20 mm×42 mm, the thickness of 0.8 mm, an area of 11 mm×11 mm on a ground substrate having a dielectric constant of 3.4, and the height of 3 mm. A resonating section is constituted by a stub (described above) having the length of 20 mm and the width of 3 mm. A longitudinal direction of the surface wave transmission line, i.e., a signal transmission direction is set as a z axis and an electrode surface of the EFC electrode is set as an xy plane.

In FIGS. 31A to 31F, a change in an electric field distribution in a zx plane in the case in which the RF signal is transmitted by interposing the surface wave transmission line in the structure shown in FIG. 30 is shown for a half period at intervals of 1/12 period. As shown in the figure, it is seen that a surface wave having amplitude in the vertical direction of the surface of the surface wave transmission line made of a metal wire propagates from the EFC antenna 1 to the EFC antenna 2.

It is known that a magnetic field is generated by a temporal change in an electric field. In FIG. 32A to 32F, a change in an electric field distribution in the xy plane in the case in which the RF signal is transmitted by interposing the surface wave transmission line in the structure shown in FIG. 30 is shown for a half period at intervals of 1/12 period.

Figure 33:
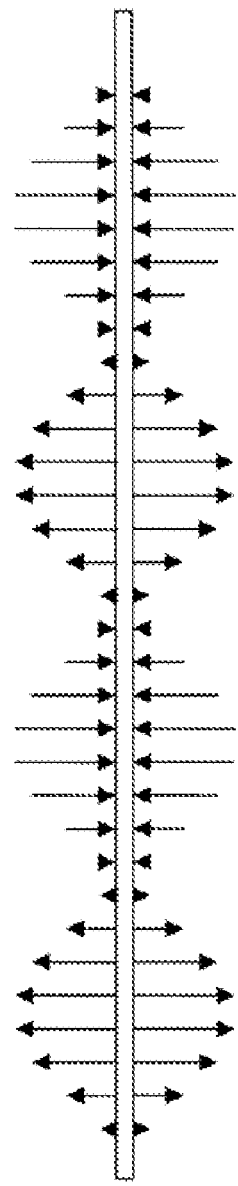
FIG. 33 is a diagram schematically showing an electric field distribution and a magnetic field distribution that are generated around the surface wave transmission line in the structure shown in FIG. 30.
Figure 33:
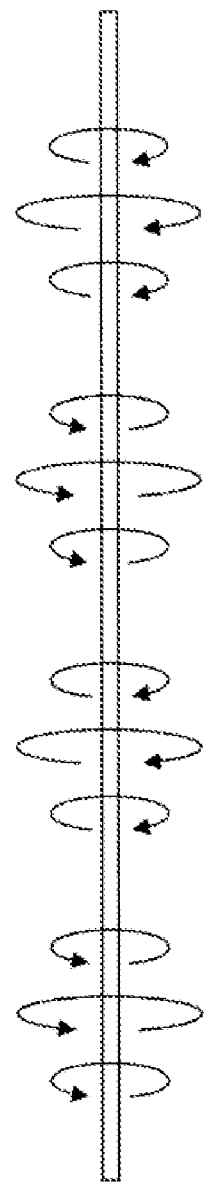

In FIG. 33, an electric field distribution and a magnetic field distribution that are generated around the surface wave transmission line made of a metal wire are schematically shown on the basis of FIGS. 31A to 31F and FIGS. 32A to 32F. As shown in the figure, a signal is propagated by an electric field perpendicular to the surface wave transmission line and an magnetic field generated as if coiling around the outer side of the surface wave transmission line. Energy is distributed from the surface of the metal wire to the outer side. In other words, when a direction or the intensity of an electric current or magnetism changes (an alternate current), an electric field and a magnetic field affect each other. The magnetic field is generated when the electric field is present. The electric field is generated when the magnetic field is present. In this way, the surface wave signal propagates to a distance while alternately changing a form of energy between the electric field and the magnetic field. As described above, the surface wave propagating through the transmission path includes the surface mode in which energy concentrates near the surface of the transmission path and the volume mode in which energy concentrates in the center of the transmission path. As shown in FIG. 33, the surface wave in the surface mode mainly propagates on the surface wave transmission line made of a conductor.

It is known that the surface wave propagates through the inside of a dielectric or a magnetic body other than the surface of the conductor such as a metal wire (described above). It is also conceivable to apply a surface wave transmission line made of a dielectric or a magnetic body. When the surface wave transmission line made of a magnetic body is used, only an electric field component is generated from the EFC antenna. Since it is difficult to acquire a signal with a magnetic body having a relative dielectric constant of 1, a propagation loss of a surface wave is large. However, with a magnetic body having a relative dielectric constant larger than 1, it is possible to efficiently transmit a surface wave. When the surface wave transmission line made of a dielectric is used, a signal is propagated by an electric field perpendicular to the surface of the dielectric body, an electric field of a longitudinal wave generated in the center portion of the dielectric body and oscillating in a direction parallel to a traveling direction of the surface wave, and a magnetic field generated as if coiling around a center axis of the dielectric body.

Figure 20A:
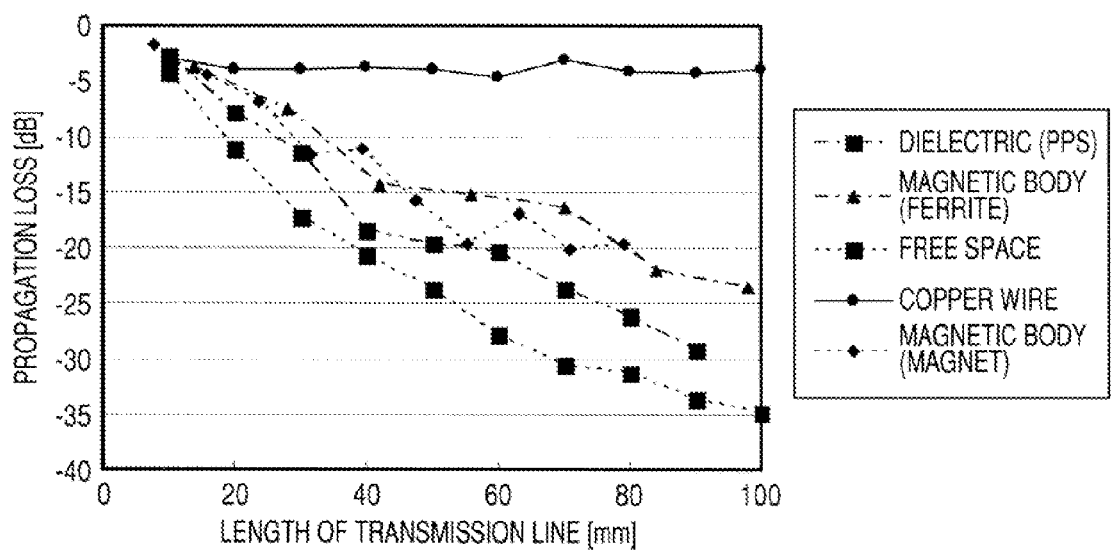
FIG. 20A is a graph showing relations between the length of a transmission line and a propagation loss in the cases in which PPS (polyphenylene sulfide resin) as a dielectric, NiZn ferrite as a magnetic body, and a magnet are used in a surface wave transmission line, respectively.
Figure 20B:
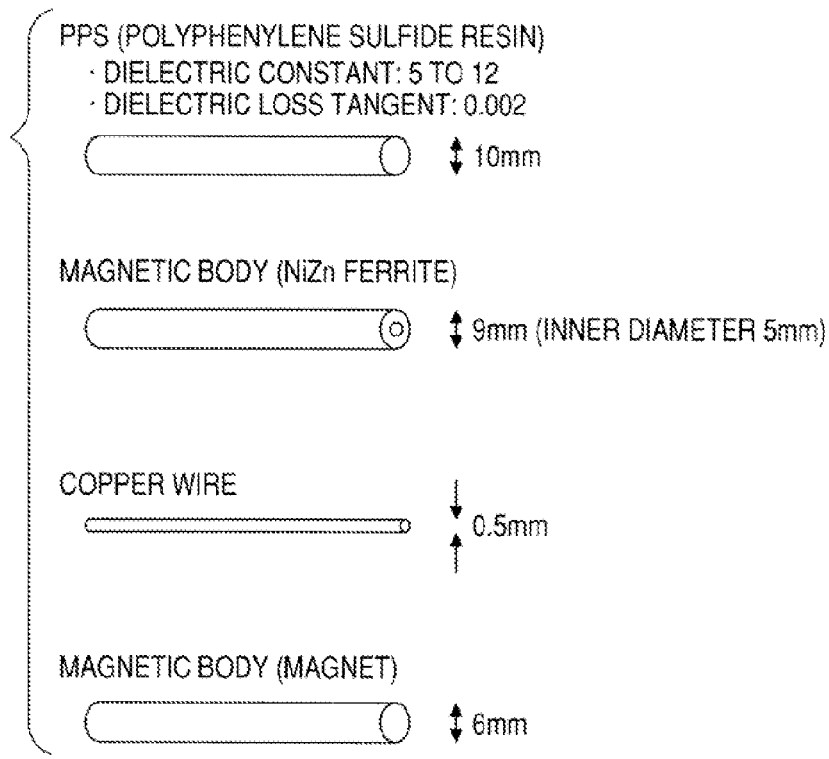
FIG. 20B is a diagram of materials used as the surface wave transmission line.
Figure 20C:
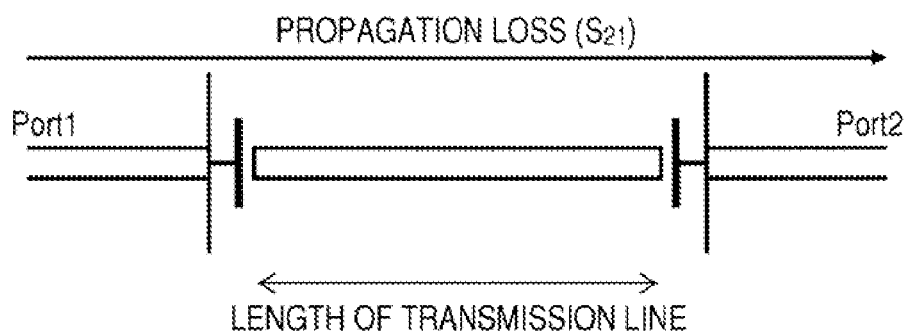
FIG. 20C is a diagram for explaining a propagation loss.

In FIG. 20A, a relation between the length of a transmission line and a propagation loss in the case in which a copper wire is used in the surface wave transmission line is shown in comparison with relations between the length of a transmission line and a propagation loss in the cases in which PPS (polyphenylene sulfide resin) as a dielectric, NiZn ferrite as a magnetic body, and a magnet are used in a surface wave transmission line, respectively. The copper line has a diameter of 0.5 mm, the PPS has a dielectric constant of 5 to 12, a dielectric dissipation factor of 0.002, and a diameter of 10 mm, and the NiZn ferrite has a diameter of 9 mm (an inner diameter of 5 mm), and the magnet has a diameter of 6 mm (see FIG. 20B). A propagation loss $S_{21}$ of the surface wave transmission line is a loss of propagation of the surface wave from an RF signal line. (Port1) of the transmitter to an RF signal line (Port2) of the receiver when the surface wave transmission line is placed between the electrodes (see FIG. 20C). It can be understood that, as shown in FIG. 20A, compared with the case in which the surface wave is propagated in a free space, i.e., without arranging the surface wave transmission line, a propagation loss is reduced because the surface wave transmission line is interposed between the EFC antennas of the transmitter and the receiver. As it is seen from the figure, in the surface wave transmission line made of a conductor such as a copper wire, compared with the surface wave transmission line made of a dielectric or the like, a propagation loss of the surface wave is remarkably reduced.

Therefore, it is possible to use the surface wave transmission line made of a conductor such as a copper wire as an extension cable for increasing a communication distance of non-contact communication with a simple structure. Since the surface wave transmission line made of a conductor has an extremely low propagation loss, the surface wave transmission line is sufficiently usable even if the transmission line is branched or bound. Thus, it is possible to disperse communication spots for performing non-contact communication in plural places, relax positioning accuracy for electrodes of the non-contact communication system that performs communication according to electric-field-coupling, and perform communication in plural locations (described later).

The propagation loss $S_{21}$ of the surface wave transmission line made of a conductor depends not only on a material of the surface wave transmission line but also on a gap "d" between the EFC electrode and the surface wave transmission line opposed to the EFC electrode and a size of the end face of the surface wave transmission line with respect to an area of the EFC electrode.

Figure 34:
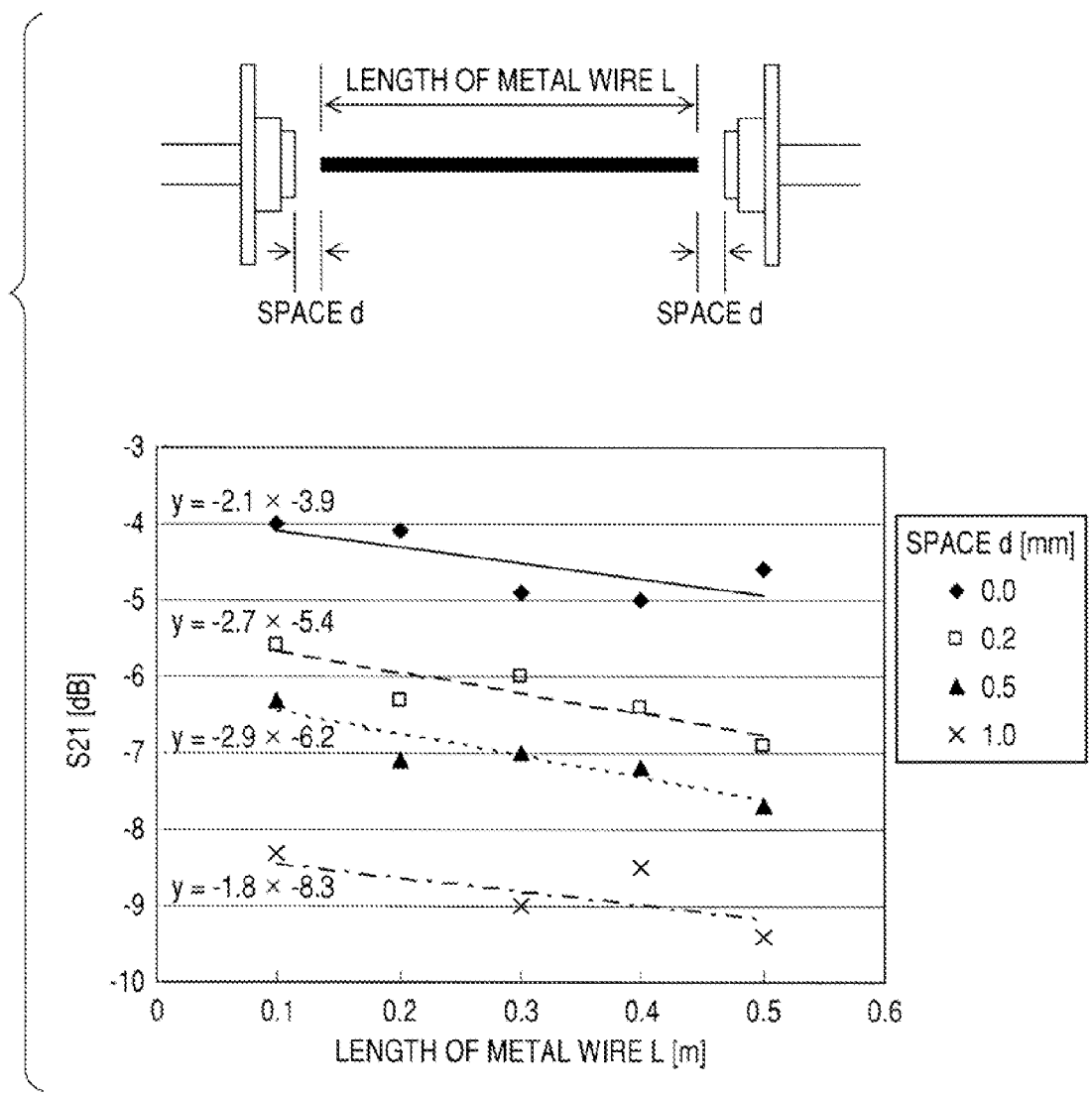
FIG. 34 is a diagram showing measured values of a propagation loss $S_{21}$ of a surface wave transmission line made of a metal wire.

Measured values of the propagation loss $S_{21}$ of the surface wave transmission line made of a metal wire are shown in FIG. 34. Measurement was performed by arranging a surface wave transmission line made of a copper wire having a diameter of 0.5 mm between two EFC antennas having a measured frequency of 4 GHz, a ground size of 20 mm×20 mm, and an EFC electrode size of 10 mm×10 mm. When d=0, the metal wire and the EFC electrode were brought into electric contact with each other. However, the inventors consider that, since the surface wave transmission line is a single line without a feedback line, unlike the wired transmission of a signal between the EFC electrodes, the surface wave propagates the surface of the metal wire as the surface wave to the end.

It is seen from a measurement result shown in the figure that the propagation loss $S_{21}$ is larger and a loss is smaller as the gap "d" between the EFC electrode and the end face of the surface wave transmission line is smaller. A loss per a unit length (1 m) of the surface wave transmission line is about 2 dB/m to 3 dB/m regardless of the gap "d". It is not always indispensable that the surface wave transmission line made of a metal wire and the EFC electrode are in electric contact with each other.

An influence of a size of the end face of the surface wave transmission line with respect to an area of the EFC electrode on the propagation loss $S_{21}$ of the surface wave transmission line will be considered.

In FIG. 35A, a state in which the electric field $E_R$ of the longitudinal wave generated on the surface of an EFC electrode of an EFC antenna transfers at an end of a surface wave transmission line as a surface wave is shown. As shown in the figure, it is considered that, when the electric field $E_R$ transfers to the surface of the surface wave transmission line at an angle of incidence of 90 degrees, the electric field $E_R$ is converted into a transversal wave, moves around to the surface, and efficiently propagates.

In this way, to allow the electric field $E_R$ to suitably transfer to the surface of the surface wave transmission line, it is preferable that a section of the surface wave transmission line is sufficiently small compared with the EFC electrode. Conversely, as shown in FIG. 35B, when an area of the end face of the surface wave transmission line is too large, the electric field $E_R$ of the longitudinal wave generated on the surface of the EFC electrode of the EFC antenna may be unable to move around to the surface at the end of the surface wave transmission line and transfer as a surface wave.

In FIG. 36, a result obtained by simulating a relation between the thickness of the surface wave transmission line made of a metal wire and a propagation loss using a finite element method is shown. A ground substrate of the EFC antenna has an area of 20 mm×42 mm, the thickness of 0.8 mm, a dielectric constant of 3.4, the length of a resonation stub of 20 mm, and the width of 3 mm. An area of the EFC electrode is 11 mm×11 mm and the height thereof is 3 mm. An electric conductivity of the surface wave transmission line is 58,000,000 [Siemens/m] and the length thereof is 49.6 mm. A gap between the EFC electrodes is 50 mm (a distance between the end of the surface wave transmission line and the EFC electrode is 0.2 mm) and a working frequency is 4.5 GHz. According to an example shown in the figure, it is seen that a loss is smaller as a sectional area of the surface wave transmission line is sufficiently small compared with the area of the EFC electrode.

Figure 5:
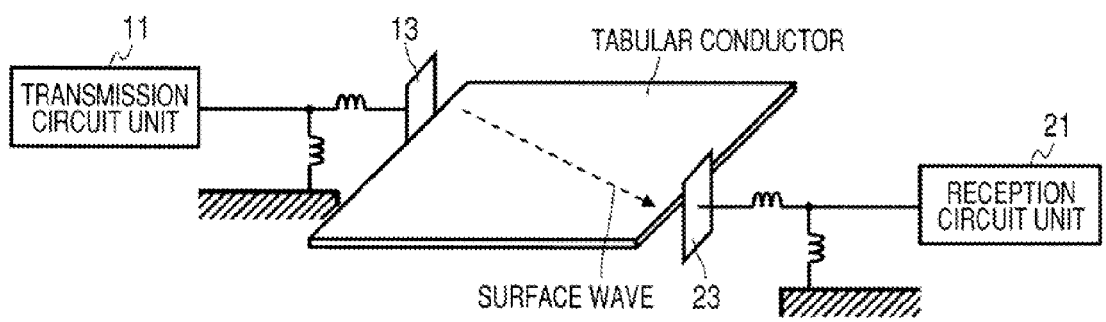
FIG. 5 is a diagram showing an example of a surface wave transmission line formed in a tabular shape.
Figure 6:
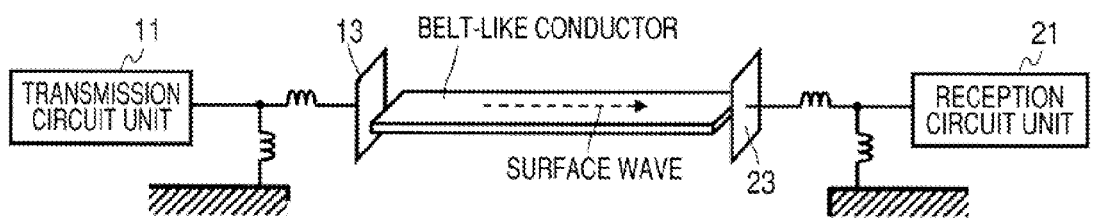
FIG. 6 is a diagram showing an example of a surface wave transmission line formed in a belt shape.
Figure 7:
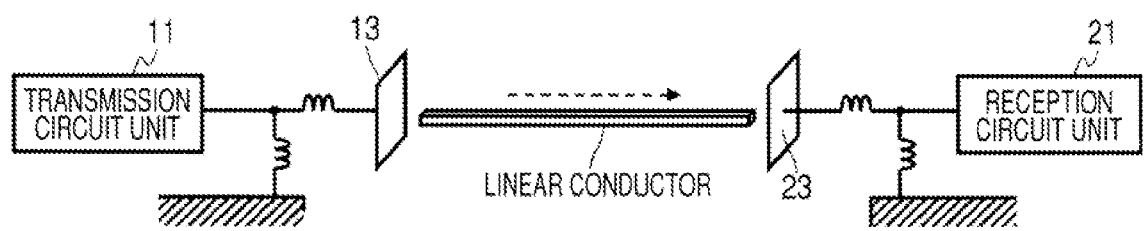
FIG. 7 is a diagram showing an example of a surface wave transmission line formed in a linear shape.
Figure 8:
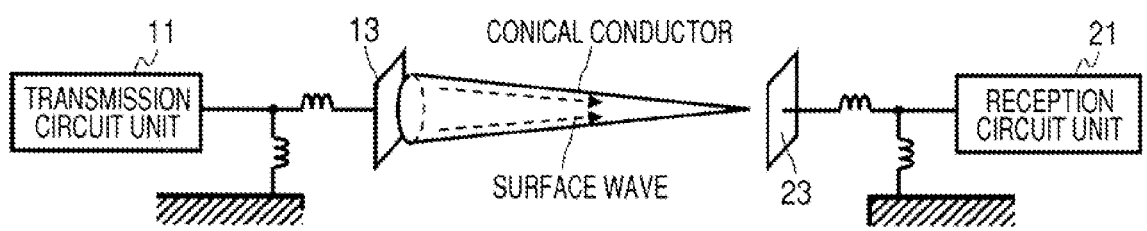
FIG. 8 is a diagram showing an example of a surface wave transmission line formed in a conical shape.

A shape of the surface wave transmission line 30 made of a conductor is not specifically limited. For example, the shape may be a tabular shape shown in FIG. 5, a belt shape shown in FIG. 6, or a linear shape shown in FIG. 7. By forming the surface wave transmission line 30 in a linear shape and setting a sectional area thereof small as shown in FIG. 7, the density of a propagating surface wave increases and it is possible to efficiently propagate the surface wave to a specific reception destination. Moreover, when the surface wave transmission line 30 is formed in a conical shape and a vertex of the cone is pointed at the specific receiver 20 as shown in FIG. 8, it is possible to propagate a surface wave acquired on a bottom surface thereof from the EFC electrode of the transmitter 10 and concentrate the surface wave in the vertex portion. Thus, it is possible to realize efficient propagation. For example, such a structure of the transmission line is advantageous when one-way communication from one communication apparatus to the other communication apparatus.

Figure 9:
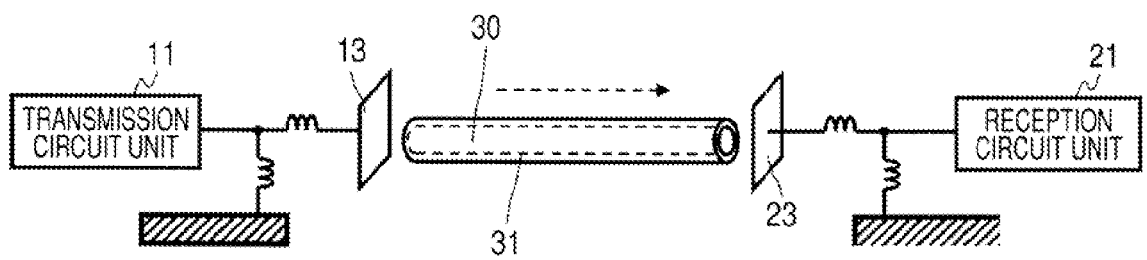
FIG. 9 is a diagram showing an example of a structure of a surface wave transmission line in which the surface of a metal conductor is further covered with a layer of an insulator.

As shown in FIG. 9, the surface of the surface wave transmission line 30 made of a metal conductor may be coated with an outer layer 31 made of an insulator to prevent short circuit from being caused by contact of the user's hand or a conductive foreign matter.

Figure 10:
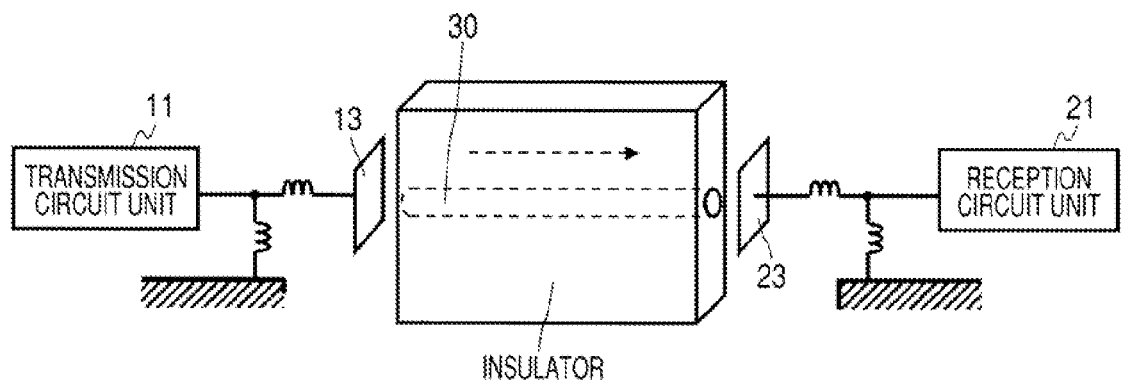
FIG. 10 is a diagram showing a state in which the surface wave transmission line made of a metal conductor is embedded in an insulator.

In FIG. 10, a state in which the surface wave transmission line made of a metal conductor is embedded in an insulator is shown. In this case, it is possible to obtain the effect of prevention of short circuit as in the example of the structure shown in FIG. 9. It is possible to constitute this insulator as, for example, a rack or a member for positioning of the EFC electrodes 13 and 23 of the transmitter 10 and the receiver 20.

Figure 11:
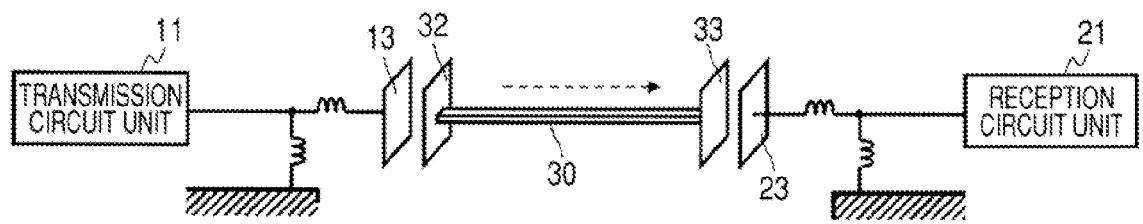
FIG. 11 is a diagram showing a state in which EFC electrodes 32 and 33 are attached to both ends of a surface wave transmission line 30 and opposed to a transmission electrode and a reception electrode, respectively.

As described above, in order to efficiently acquire a surface wave generated from the transmission electrode 13 of the transmitter 10 and efficiently transmit a transmitted surface wave to the reception electrode 23 of the receiver 20, it is preferable to dispose the respective end faces of the surface wave transmission line in a direction perpendicular to the respective electrode surface. Moreover, in order to efficiently acquire a surface wave generated in the transmitter 10 in the surface wave transmission line and efficiently transmit a transmitted surface wave to the receiver 20, as shown in FIG. 11, electrodes 32 and 33 for coupling may be attached to both the ends of the surface wave transmission line 30 and arranged to be opposed to the transmission electrode and the reception electrode, respectively. The electrodes 32 and 33 for coupling are attached to be substantially perpendicular to the traveling direction of the surface wave through the surface wave transmission line 30 in order to efficiently acquire a surface wave of an electric field radiated from the transmission electrode or efficiently transmit a radiation-electric-field to the reception electrode.

Figure 12:
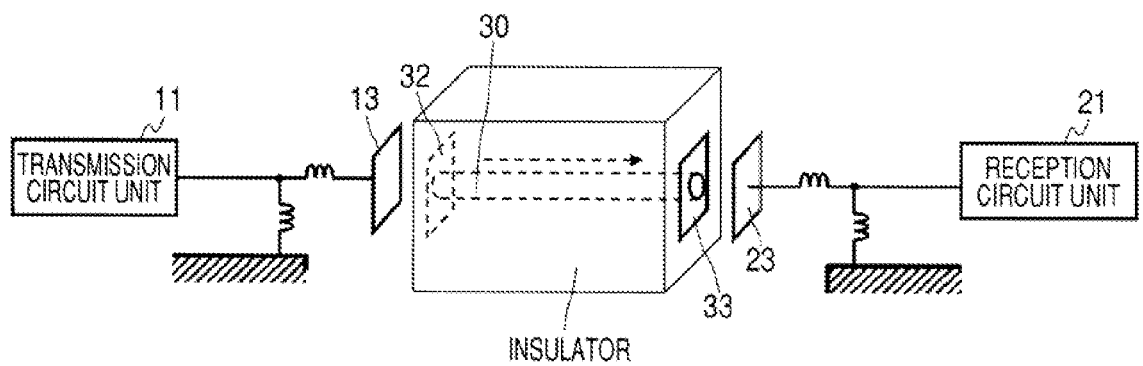

Even in the form shown in FIG. 11, the surface of the surface wave transmission line may be coated with an insulator to prevent short circuit from being caused by contact of the user's hand or a conductive foreign matter. It goes without saying that, as shown in FIG. 12, it is also possible to embed the surface wave transmission line 30 shown in FIG. 11 in an insulator that constitutes a rack or the like.

In the communication system of the electric-field-coupling scheme according to the embodiment of the present invention, it is possible to interpose the surface wave transmission line made of a conductor between the transmission electrode and the reception electrode to increase a communication distance. It is possible to use the surface wave transmission line 30 as an extension cable. Even if the surface wave transmission line made of a conductor is branched or bound, it is still possible to keep a propagation loss at a low level. Therefore, it is possible to disperse communication spots for performing non-contact communication in plural places, relax positioning accuracy for electrodes of the non-contact communication system that performs communication according to electric-field-coupling, and perform communication in plural locations.

Figure 13:
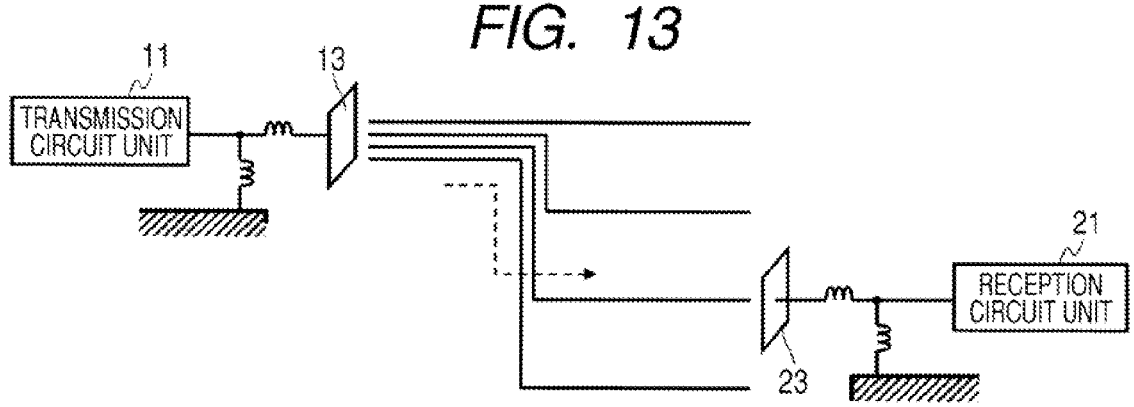
FIG. 13 is a diagram showing a state in which plural surface wave transmission lines 30-1 to 30-4 are bound and one end face of the bound surface wave transmission lines is disposed to be opposed to a field radiation surface of a transmission electrode 13 of the transmitter 10.

In FIG. 13, a state in which plural surface wave transmission lines 30-1 to 30-4 are bound and one end face of the bound surface wave transmission lines is disposed to be opposed to a field radiation surface of the transmission electrode 13 of the transmitter 10 is shown. In such a case, it is possible to propagate a surface wave acquired from the transmission electrode 13 while keeping a propagation loss at a low level in all the surface wave transmission lines 30-1 to 30-4. By arranging the reception electrode 21 of the receiver 20 to be opposed to any one of the other end faces B1 to B4 of the surface wave transmission lines 30-1 to 30-4, it is possible to perform data communication with the transmitter 10. In other words, the transmitter 10 is capable of performing data communication with the receiver 20 in plural locations.

In order to control interference due to reflection from the end faces of the surface wave transmission lines to which the receiver 20 is not opposed, it is desirable to set the lengths of the surface wave transmission lines 30-1 to 30-4 to n/2 (n is a positive integer) of a wavelength of a signal used for communication, respectively.

Figure 14:
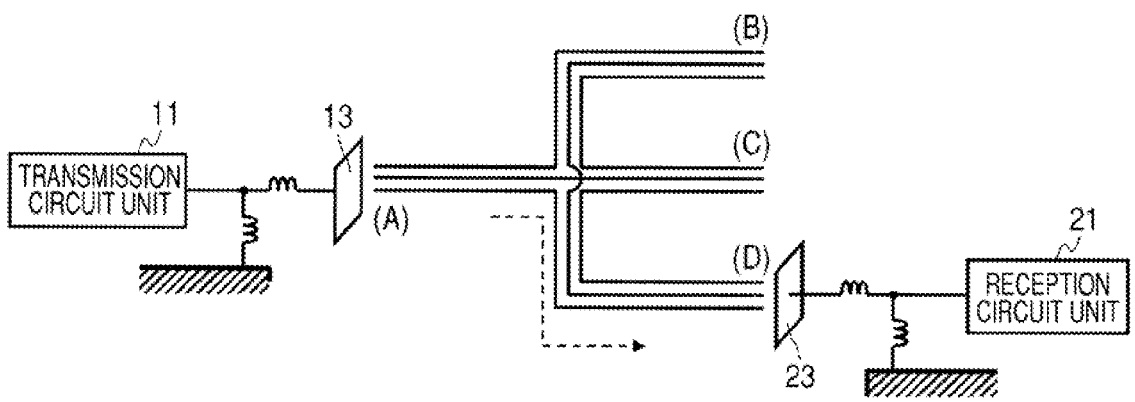
FIG. 14 is a diagram showing a state in which plural communication spots are provided and plural surface wave transmission lines that connect the respective communication spots in a one to one relation are laid.

In FIG. 14, a state in which plural communication spots are provided and plural surface wave transmission lines that connect the respective communication spots in a one to one relation are laid is shown. In an example shown in the figure, four communication spots A to D are set and the communication spots A and B, B and C, C and D, and D and A are connected by four surface wave transmission lines in total for connecting the communication spots in a one to one relation. Each of the surface wave transmission lines can propagate a surface wave acquired from the transmission electrode 13 while keeping a propagation loss at a low level. In each of the communication spots, the plural surface wave transmission lines laid for performing data communication with the other communication spots are bound. In such a case, the communication spots for performing non-contact communication are dispersed in plural locations. One terminal can perform data communication with a terminal in any one of the plural locations in a one to one relation. A terminal present in the communication spot A can perform data communication by electric-field-coupling with any one of the communication spots B to D using the surface wave transmission line corresponding to the communication spot. Therefore, a degree of freedom of positions of both the transmitter 10 and the receiver 20 is improved.

In order to control interference due to reflection from the end faces of the surface wave transmission lines to which the receiver 20 is not opposed, it is desirable to set the lengths of the four surface wave transmission lines in total between A and B, B and C, C and D, and D and A to n/2 (n is a positive integer) of a wavelength of a signal used for communication, respectively.

Figure 15:
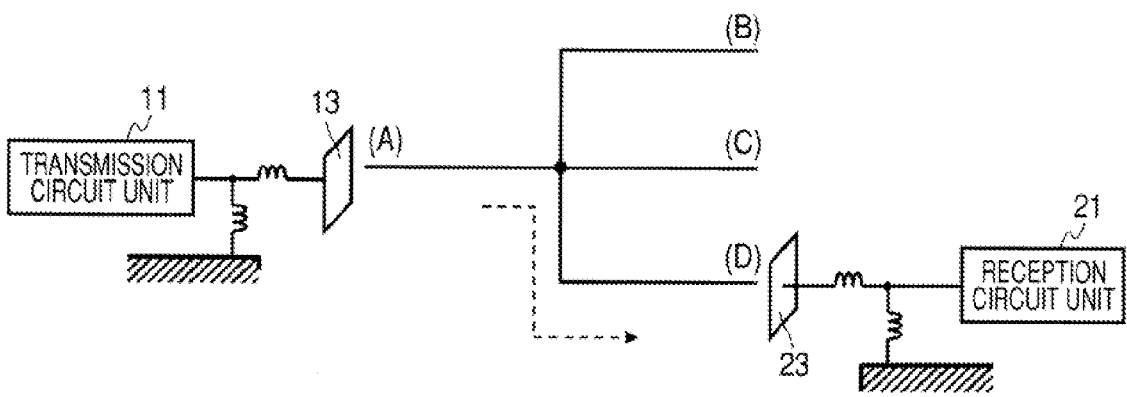
FIG. 15 is a diagram showing a state in which a surface wave transmission line from one communication spot on a transmission side is branched to plural communication spots in which a receiver is set.

In FIG. 15, although plural communication spots are provided as in FIG. 14, instead of laying surface wave transmission lines for each combination of communication spots, a surface wave transmission line from one communication spot on a transmission side is branched to plural communication spots in which the receiver 20 is set. In this case, as in the transmission line structure shown in FIG. 14, by setting the transmitter 10 and the receiver 20 in any one of the communication spots, respectively, it is possible to perform data communication by electric-field-coupling and a degree of freedom of positions of both the transmitter 10 and the receiver 20 is improved. Since a transmission loss is remarkably reduced by using a conductor such as a copper wire in the surface wave transmission line, even if the surface wave transmission line is branched, it is possible to receive an RF signal with sufficient field intensity at the ends of the respective branched surface wave transmission lines.

In this case, in order to control interference due to reflection from the end faces of the surface wave transmission lines to which the receiver 20 is not opposed, it is desirable to set the lengths of the surface wave transmission lines between a branch point and A, the branch point and B, the branch point and C, and the branch point and D to n/2 (n is a positive integer) of a wavelength of a signal used for communication, respectively.

Figure 16:
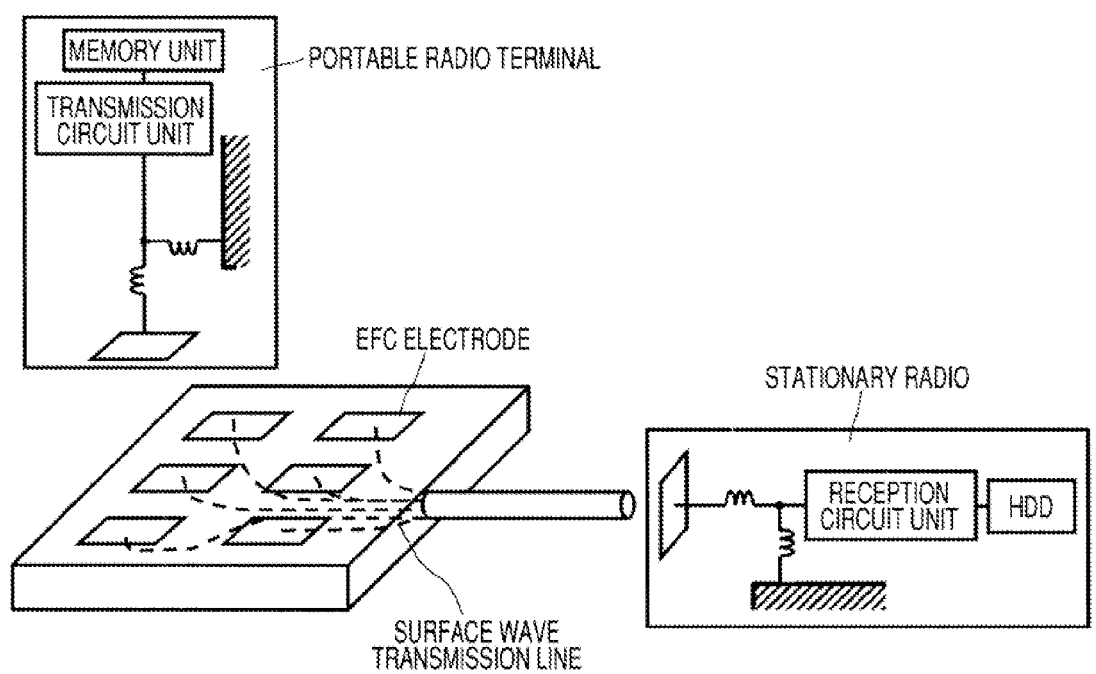
FIG. 16 is a diagram showing a specific form of a structure of a surface wave transmission line.

In FIG. 16, a specific form of the surface wave transmission line structure shown in FIG. 13 is shown. In a pad for non-contact communication, plural surface wave transmission lines connected to EFC electrodes, respectively, are embedded. The respective surface wave transmission lines are bound and the other end of the surface wave transmission lines bound is arranged to be opposed to a reception electrode of a stationary radio such as a PC or an HDD recorder.

For example, a portable radio terminal operating as a transmitter such as a digital camera includes a transmission circuit unit that generates an RF signal for transmitting data stored in a memory, a resonating section including parallel and series capacitors, and a transmission electrode that radiates an electrostatic magnetic field. During data communication, when the transmission electrode is placed on the pad for non-contact communication, the EFC electrode in a position closest to the transmission electrode acquires a surface wave of a radiation-electric-field and propagates the surface wave to the reception electrode of the stationary radio through the surface wave transmission line corresponding to the EFC electrode. Consequently, it is possible to download data of images or the like from the portable radio terminal to the stationary radio.

Figure 17:
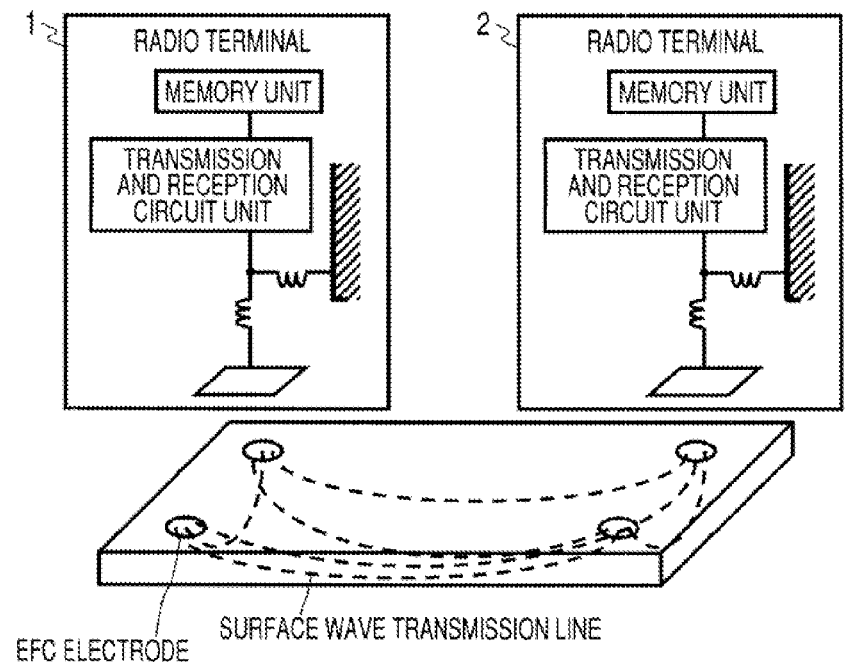
FIG. 17 is a diagram showing a specific form of a structure of a surface wave transmission line.

In FIG. 17, a specific form of the surface wave transmission line structure shown in FIG. 14 is shown. Plural EFC electrodes are disposed on the surface of a flat sheet. Plural surface wave transmission lines that connect the EFC electrodes in a one to one relation are embedded in the sheet. Each of radio terminals includes a memory unit that stores transmission and reception data, a transmission and reception circuit unit that performs transmission and reception processing for an RF signal, a resonating unit including parallel and series capacitors, and an electrode that performs radiation or reception of an electrostatic magnetic field.

During data communication, when electrodes of radio terminals serving as a transmitter and a receiver are placed on the surface of the flat sheet, the EFC electrode in a position closest to a transmission electrode of the transmitter acquires a surface wave of a radiation-magnetic-field and propagates the surface wave using the surface wave transmission line that connects this EFC electrode and an EFC electrode in a position closest to a reception electrode of the receiver. The receiver can receive data. If places of the ends of the surface wave transmission lines are increased, it is possible to perform communication simply by placing a radio terminal having a surface wave transceiver built therein in an arbitrary position on the sheet.

It is also possible to perform communication among plural radio terminals placed on the flat sheet. When an electrode of one radio terminal serving as a transmitter is placed and plural receivers are mounted on the surface of the flat sheet, a surface wave is propagated through the surface wave transmission lines that are connected to EFC electrodes in positions closest to reception electrodes of the respective receivers. Thus, it is possible to perform simultaneous and parallel data transmission, i.e., multicast, to the plural receivers.

Figure 18:
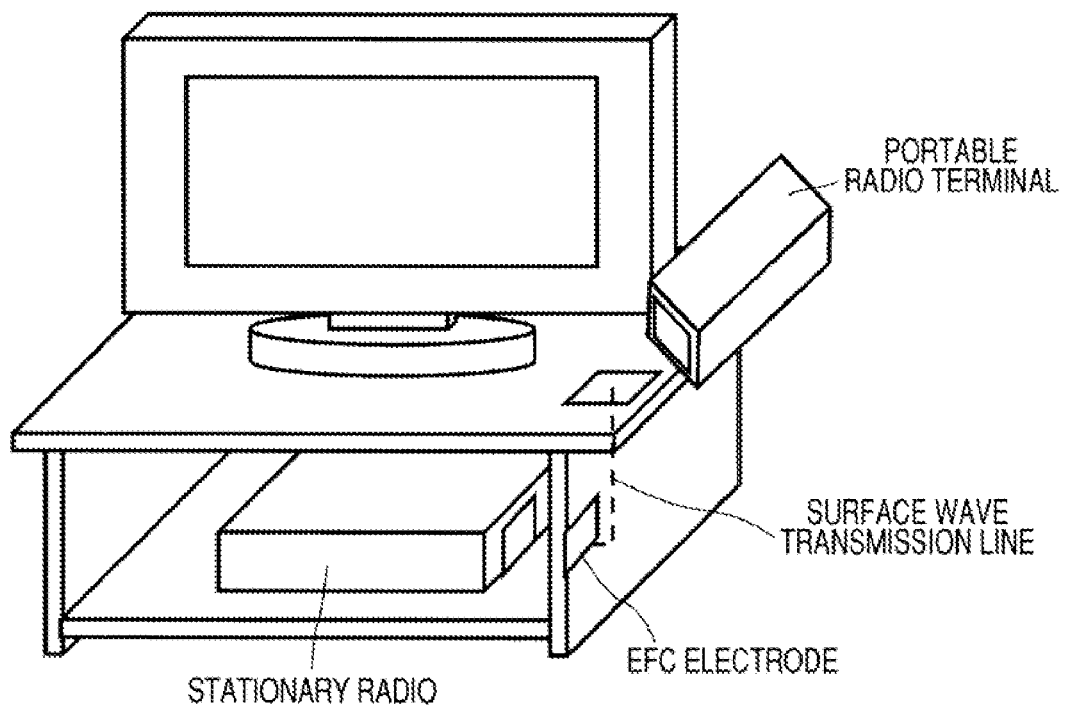
FIG. 18 is a diagram showing a specific form of a structure of a surface wave transmission line.

It is also possible to cascade the surface wave transmission lines shown in FIG. 11 to use the cascaded surface wave transmission lines as an extension cable and realize connection with a communication partner set in a complicated location. In FIG. 18, a specific form of a structure of the surface wave transmission line in this case is shown. As shown in the figure, a stationary radio is set in a rack embedded with the surface wave transmission line in advance. It is possible to draw out a signal to a position easily accessible from the outside and perform non-contact communication without taking out the stationary radio from the rack.

The mechanism for transmitting a signal between the pair of EFC antennas through the interposition of the surface wave transmission line in the communication system shown in FIG. 1 has been explained. Since the transmission of the signal between the two apparatuses inevitably involves movement of energy, it is also possible to apply this kind of communication system to electric power transmission. As described above, the electric field $E_R$ generated by the EFC antenna of the transmitter propagates on the surface wave transmission line as a surface wave. The receiver can rectify and stabilize a signal received by the EFC antenna and extract electric power.

Figure 37:
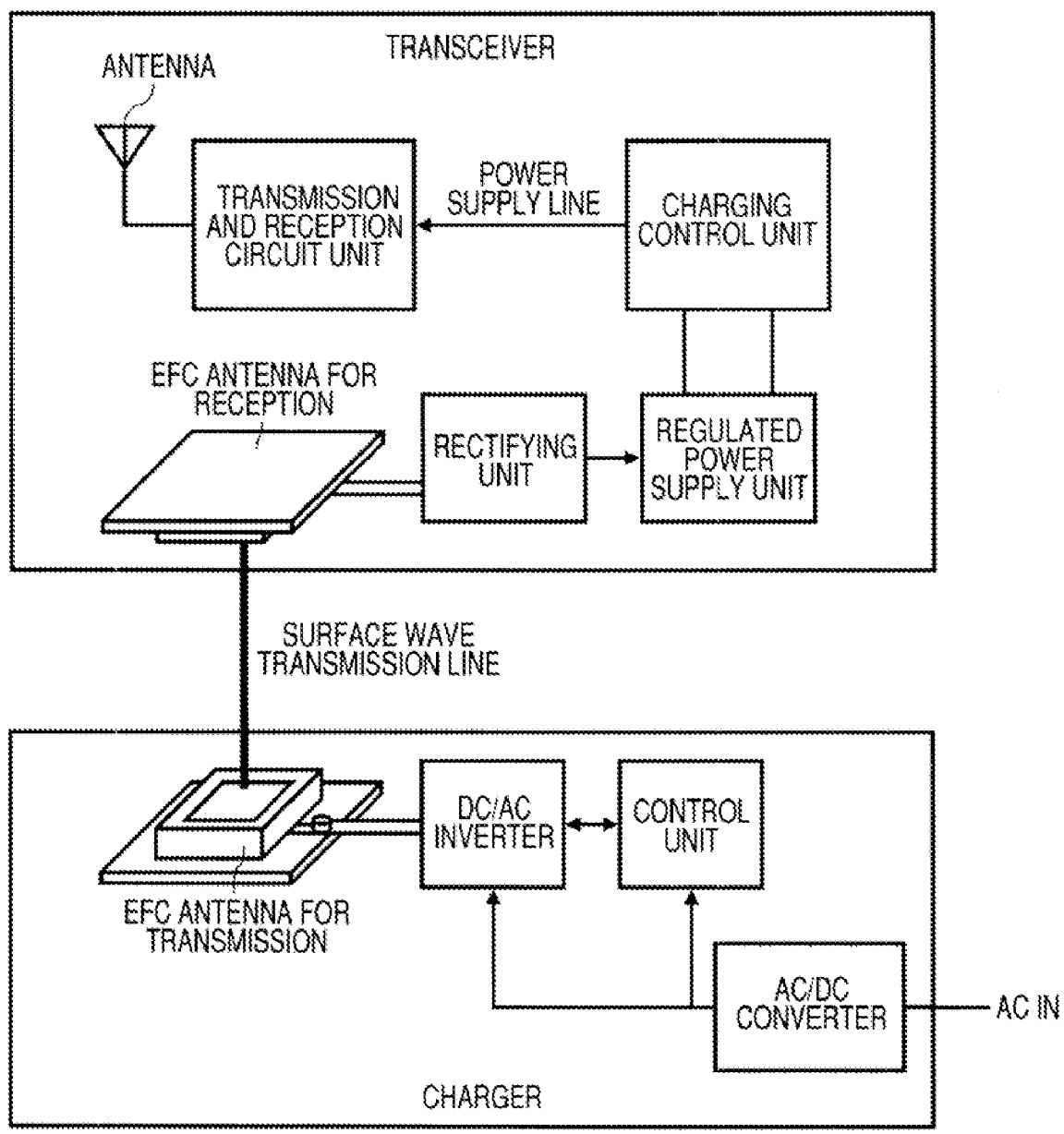
FIG. 37 is a diagram showing an example of a structure of the communication system shown in FIG. 1 applied to electric power transmission.

In FIG. 37, an example of a structure of the communication system shown in FIG. 1 applied to electric power transmission is shown.

In the system shown in the figure, it is possible to perform, using a charger having an EFC antenna built therein connected to an AC power supply and a radio having an EFC antenna built therein, power transmission and charging to the radio via a surface wave transmission line placed between the EFC antennas. The EFC antennas are used only for power transmission.

When the EFC antenna that receives electric power is not present near the EFC antenna that transmits electric power, most of electric power inputted to the EFC antenna for power transmission reflects and returns to a DC/AC inverter. Thus, it is possible to prevent an unnecessary radio wave from being radiated to the outside and electric power from being consumed more than necessary.

In the example shown in the figure, the radio is charged. However, what is charged is not limited to the radio. For example, non-contact power transmission to, for example, a music player and a digital camera may be performed.

Figure 38:
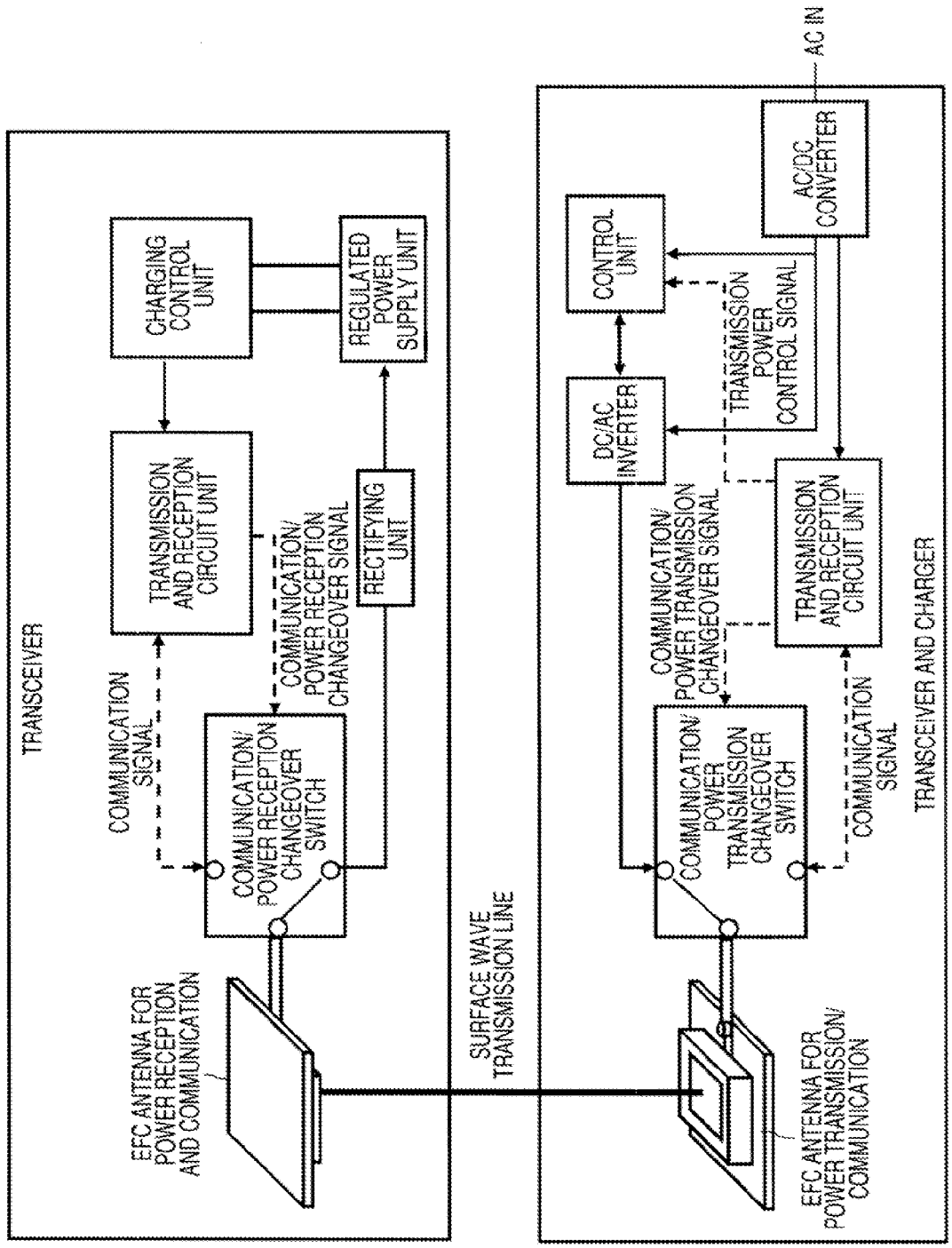
FIG. 38 is a diagram showing an example of another structure of the communication system shown in FIG. 1 applied to electric power transmission.

In FIG. 38, an example of another structure in which the communication system shown in FIG. 1 is applied to power transmission is shown. In the system shown in the figure, EFC antennas and a surface wave transmission line are used for both power transmission and communication.

Switching of timing for performing communication and power transmission is performed according to a communication and power transmission (reception) switching signal sent from a transmission circuit unit. For example, communication and power transmission may be switched at a period determined in advance. In this case, a state of charging is fed back to a charger in addition to a communication signal to keep transmission power optimum. For example, when charging is completed, information on the completion is sent to the charger to reduce transmission power to 0. Alternatively, communication data may be superimposed on electric power.

The system shown in the figure is constituted by connecting the charger to an AC power supply. Besides, for example, the system may be used for an application for distributing electric power to a cellular phone running short of battery power from other cellular phones.

The present invention has been explained in detail referring to the specific embodiment. However, it is obvious that those skilled in the art can perform alteration and substitution without departing from the spirit of the present invention.

In this specification, the embodiment in which the present invention is applied to the communication system that transmits a UWB signal according to electric-field electric-coupling in a cableless manner has been mainly explained. However, the gist of the present invention is not limited to this. For example, it is also possible to apply the present invention to a communication system that uses an RF signal other than the UWB communication scheme and a communication system that performs data transmission according to electric-field-coupling using a relatively low frequency signal.

In this specification, the embodiment in which the present invention is applied to the system that performs data communication between the pair of EFC antennas through the interposition of the surface wave transmission line has been mainly explained. However, since the transmission of the signal between the two apparatuses inevitably involves movement of energy, naturally, it is also possible to apply this kind of the communication system to electric power transmission.

In short, the present invention has been disclosed in a form of illustration. The description of this specification should not be limitedly interpreted. To judge the gist of the present invention, appended claims should be taken into account.

It should be understood by those skilled in the art that various modifications, combinations, sub-combinations, and alterations may occur depending on design requirements and other factors insofar as they are within the scope of the appended claims or the equivalents thereof.

What is claimed is:

1. A communication system comprising:
a transmitter including a transmission circuit unit that generates an RF signal for transmitting data and an electric-field-coupling antenna that transmits the RF signal as an electrostatic field;
a receiver including an electric-field-coupling antenna and a reception circuit unit that subjects an RF signal received by the electric-field-coupling antenna to reception processing; and
surface-wave propagating means for providing a surface wave transmission line made of a conductor that propagates a surface wave radiated from the electric-field-coupling antenna of the transmitter along a surface of the surface wave transmission line,
wherein the surface wave transmission line is attached with, at least at one end thereof, an EFC electrode for electrostatic coupling with the electric-field-coupling antenna of the transmitter or the receiver to be substantially perpendicular to a traveling direction of the surface wave.

2. A communication system comprising:
a transmitter including a transmission circuit unit that generates an RF signal for transmitting data and an electric-field-coupling antenna that transmits the RF signal as an electrostatic field;
a receiver including an electric-field-coupling antenna and a reception circuit unit that subjects an RF signal received by the electric-field-coupling antenna to reception processing;
surface-wave propagating means for providing a surface wave transmission line made of a conductor that propagates a surface wave radiated from the electric-field-coupling antenna of the transmitter along a surface of the surface wave transmission line; and
plural communication spots in which the transmitter and the receiver are set,
wherein the surface-wave propagating means includes a surface wave transmission line for transmitting a surface wave of an RF signal from the transmitter to the plural communication spot in which the receiver is set.

3. A communication system according to claim 2, wherein the surface-wave propagating means includes plural surface wave transmission lines that respectively connect the communication spots in which the transmitter is set and the respective communication spots in which the receiver can be set.

4. A communication system according to claim 2, wherein the surface-wave propagating means includes the surface wave transmission lines for each combination of the communication spots.

5. A communication system according to claim 2, wherein the surface-wave propagating means branches the surface wave transmission line from the communication spot in which the transmitter is set into the respective communication spots in which the receiver can be set.

6. A communication system comprising:
a transmitter including a transmission circuit unit that generates an RF signal for transmitting data and an electric-field-coupling antenna that transmits the RF signal as an electrostatic field;
a receiver including an electric-field-coupling antenna and a reception circuit unit that subjects an RF signal received by the electric-field-coupling antenna to reception processing; and
surface-wave propagating means for providing a surface wave transmission line made of a conductor that propagates a surface wave radiated from the electric-field-coupling antenna of the transmitter along a surface of the surface wave transmission line,
wherein in the transmitter, an RF signal transmission path that transmits the RF signal generated by the transmission circuit unit is connected to substantially a center of an electrode of the electric-field-coupling antenna via a resonating section that resonates at a predetermined frequency, and
wherein in the receiver, an RF signal transmission path that transmits the RF signal to the reception circuit unit to substantially a center of an electrode of the electric-field-coupling antenna via a resonating section that resonates at a predetermined frequency.

7. A communication system according to claim 6, wherein the resonating section is made of a conductor having length dependent on a wavelength in use.

8. A communication system according to claim 6, wherein the resonating section is made of a lumped constant circuit.

9. A communication system according to claim 6, wherein the resonating section includes:
a parallel inductor connected between a signal line of the RF signal transmission path and a ground; and
a series inductor connected between the signal line of the RF signal transmission path and an electrode.

10. A communication apparatus comprising:
a transmitter including a transmission circuit unit that generates an RF signal for transmitting data to a receiver and an electric-field-coupling antenna that transmits the RF signal as an electrostatic field; and
surface-wave propagating unit for providing a surface wave transmission line made of a conductor that propagates a surface wave radiated from the electric-field-coupling antenna of the transmitter along a surface of the surface wave transmission line,
wherein the surface wave transmission line is attached with, at least at one end thereof, an EFC electrode for electrostatic coupling with the electric-field-coupling antenna of the transmitter to be substantially perpendicular to a traveling direction of the surface wave.

11. A communication system comprising:
a transmitter including a transmission circuit unit that generates an RF signal for transmitting data to a receiver and an electric-field-coupling antenna that transmits the RF signal as an electrostatic field;
surface-wave propagating unit for providing a surface wave transmission line made of a conductor that propagates a surface wave radiated from the electric-field-coupling antenna of the transmitter along a surface of the surface wave transmission line; and
plural communication spots in which the transmitter and the receiver can be set,
wherein the surface-wave propagating unit includes a surface wave transmission line for transmitting a surface wave of an RF signal from the transmitter to the plural communication spots in which the receiver can be set.

12. A communication system according to claim 11, wherein the surface-wave propagating unit includes plural surface wave transmission lines that respectively connect the communication spots in which the transmitter is set and the respective communication spots in which the receiver can be set.

13. A communication system according to claim 11, wherein the surface-wave propagating unit includes the surface wave transmission lines for each combination of the communication spots.

14. A communication system according to claim 11, wherein the surface-wave propagating unit branches the surface wave transmission line from the communication spot in which the transmitter is set into the respective communication spots in which the receiver can be set.

15. A communication apparatus comprising:
- a transmitter including a transmission circuit unit that generates an RF signal for transmitting data to a receiver and an electric-field-coupling antenna that transmits the RF signal as an electrostatic field; and
- surface-wave propagating unit for providing a surface wave transmission line made of a conductor that propagates a surface wave radiated from the electric-field-coupling antenna of the transmitter along a surface of the surface wave transmission line,
- wherein in the transmitter, an RF signal transmission path that transmits the RF signal generated by the transmission circuit unit is connected to substantially a center of an electrode of the electric-field-coupling antenna via a resonating section that resonates at a predetermined frequency.

16. A communication apparatus according to claim 15, wherein the resonating section is made of a conductor having length dependent on a wavelength in use.

17. A communication apparatus according to claim 15, wherein the resonating section is made of a lumped constant circuit.

18. A communication apparatus according to claim 15, wherein the resonating section includes:
- a parallel inductor connected between a signal line of the RF signal transmission path and a ground; and
- a series inductor connected between the signal line of the RF signal transmission path and an electrode.

* * * * *